(12) United States Patent
Viehauser

(10) Patent No.: US 12,705,777 B2
(45) Date of Patent: Aug. 11, 2026

(54) POSE PREDICTION OF OBJECTS FOR EXTENDED REALITY SYSTEMS

(71) Applicant: QUALCOMM Incorporated, San Diego, CA (US)

(72) Inventor: Robert Peter Viehauser, Bad Hofgastein (AT)

(73) Assignee: QUALCOMM Incorporated, San Diego, CA (US)

( * ) Notice: Subject to any disclaimer, the term of this patent is extended or adjusted under 35 U.S.C. 154(b) by 594 days.

(21) Appl. No.: 18/174,532

(22) Filed: Feb. 24, 2023

(65) Prior Publication Data

US 2024/0289975 A1 Aug. 29, 2024

(51) Int. Cl.

| | |
|---|---|
| ***G06T 7/70*** | (2017.01) |
| ***G02B 27/01*** | (2006.01) |
| ***G06F 3/01*** | (2006.01) |
| ***G06T 19/00*** | (2011.01) |
| ***G06V 10/62*** | (2022.01) |
| ***G06V 10/75*** | (2022.01) |
| ***G06V 10/82*** | (2022.01) |
| ***G06V 10/94*** | (2022.01) |
| ***G06V 20/20*** | (2022.01) |
| ***G06V 40/10*** | (2022.01) |

(52) U.S. Cl.
CPC .............. *G06T 7/70* (2017.01); *G06T 19/006* (2013.01)

(58) Field of Classification Search
USPC .......................................................... 382/103
See application file for complete search history.

(56) References Cited

U.S. PATENT DOCUMENTS 8,179,604 B1 * 5/2012 Prada Gomez ......... G06F 1/163 359/13
11,335,077 B1 * 5/2022 Salmani Rahimi ..... G06T 19/20
(Continued)

FOREIGN PATENT DOCUMENTS

WO 2022197825 A1 9/2022

OTHER PUBLICATIONS

Doughty M., et al., "HMD-EgoPose: Head-Mounted Display-Based Egocentric Marker-Less Tool and Hand Pose Estimation for Augmented Surgical Guidance", arxiv.org, Cornell University Library, 201 OLIN Library Cornell University Ithaca, NY 14853, Feb. 24, 2022, pp. 1-21, XP091164304, abstract figures 1, 2, 6 p. 4, paragraph 4-p. 10, paragraph 2.
(Continued)

*Primary Examiner* — Chineyere Wills-Burns
(74) *Attorney, Agent, or Firm* — Polsinelli LLP/QUALCOMM Incorporated

(57) ABSTRACT

Systems and techniques are described herein for providing virtual content for a display. A method for providing virtual content for a display is provided. The method may include obtaining a plurality of images captured by a camera of a device, each image of the plurality of images including a respective representation of an object in an environment; predicting, based on the plurality of images, a pose of the object in a reference coordinate system associated with the environment; determining, based on the predicted pose of the object in the reference coordinate system, a pose of the object relative to the device; and providing, to a display of the device, virtual content based on the pose of the object relative to the device.

22 Claims, 8 Drawing Sheets

(56) References Cited

U.S. PATENT DOCUMENTS

| | | | | |
|---|---|---|---|---|
| 2013/0215230 | A1* | 8/2013 | Miesnieks | H04N 13/20 348/46 |
| 2015/0347846 | A1* | 12/2015 | Guzmán-Rivera | G06V 10/774 382/103 |
| 2016/0253844 | A1* | 9/2016 | Petrovskaya | G06F 3/011 345/633 |
| 2017/0205892 | A1 | 7/2017 | Petrovskaya et al. | |
| 2018/0108179 | A1* | 4/2018 | Tomlin | G06F 3/0346 |
| 2020/0320720 | A1* | 10/2020 | Baig | G06T 7/248 |
| 2020/0342675 | A1* | 10/2020 | Leuze | G06T 7/0012 |
| 2020/0349772 | A1* | 11/2020 | Tkach | G06V 20/647 |
| 2021/0055545 | A1* | 2/2021 | Rodgers | G06N 3/0455 |
| 2021/0064925 | A1* | 3/2021 | Shih | H04N 7/0135 |
| 2021/0350564 | A1* | 11/2021 | Peuhkurinen | G06T 7/593 |
| 2022/0036577 | A1* | 2/2022 | Lopez Mendez | G06N 3/0455 |
| 2022/0092796 | A1* | 3/2022 | Noh | G06T 7/97 |
| 2022/0180553 | A1* | 6/2022 | Ji | G06T 7/73 |
| 2022/0301304 | A1 | 9/2022 | Hampali et al. | |

OTHER PUBLICATIONS

International Search Report and Written Opinion—PCT/US2024/011058—ISA/EPO—Apr. 15, 2024.

Lima J.P., et al., "Standalone Edge-Based Markerless Tracking of Fully 3-Dimensional Objects for Handheld Augmented Reality", Proceedings of the 16th ACM Symposium on Virtual Reality Software and Technology, Nov. 18 - 20, 2009, Kyoto, Japan, ACM, 2 Penn Plaza, Suite 701 New York NY 10121-0701 USA, Nov. 18, 2009, pp. 139-142, XP058210125, Abstract, Figures 2, 5, p. 139, col. 2, Paragraph 3-p. 142, col. 1, Line 5, Abstract, Figures 1, 2, 5, p. 139, col. 2, Paragraph 3-p. 142, Line 5.

Schutt P., et al., "Semantic Interaction in Augmented Reality Environments for Microsoft HoloLens", 2019 European Conference on Mobile Robots (ECMR), IEEE, Sep. 4, 2019, 6 pages, XP033635181, Abstract, Figures 1, 2, 5 p. 2, col. 2, Paragraph 1-p. 5, col. 2, Paragraph 1, Abstract, Figures 1, 2, 4, 5, p. 2, col. 2, Paragraph 1-p. 4, col. 2, Paragraph 2.

* cited by examiner

POSE PREDICTION OF OBJECTS FOR EXTENDED REALITY SYSTEMS

TECHNICAL FIELD

The present disclosure generally relates to providing virtual content. For example, aspects of the present disclosure include systems and techniques for performing pose prediction of objects for extended reality systems, such as based on a position and/or orientation of a display and based on a position and/or orientation of an object.

BACKGROUND

An extended reality (XR) (e.g., virtual reality (VR), augmented reality (AR), and/or mixed reality (MR)) system can provide a user with a virtual experience by immersing the user in a completely virtual environment (made up of virtual content) and/or can provide the user with an augmented or mixed reality experience by combining a real-world or physical environment with a virtual environment.

Some XR systems provide augmented or mixed reality to users by presenting a user with virtual content, within a field of view of the user, while allowing the user to simultaneously view the real world. As an example, a see-through XR system may include a transparent display allowing a user to see the real word and allowing the XR system to display virtual content alongside and/or overlaid onto, in the user's field of view, the real world. See-through XR systems may be wearable (e.g., head-borne) and may include transparent lenses to be worn in front of one or both of the user's eyes.

SUMMARY

Systems and techniques are described for providing virtual content for a display. According to at least one example, a method is provided for providing virtual content for display. The method includes: obtaining a plurality of images captured by a camera of a device, each image of the plurality of images including a respective representation of an object in an environment; predicting, based on the plurality of images, a pose of the object in a reference coordinate system associated with the environment; determining, based on the predicted pose of the object in the reference coordinate system, a pose of the object relative to the device; and providing, to a display of the device, virtual content based on the pose of the object relative to the device.

In another example, an apparatus for providing virtual content for display is provided that includes at least one memory and at least one processor (e.g., configured in circuitry) coupled to the at least one memory. The at least one processor may be configured to: obtain a plurality of images captured by a camera of a device, each image of the plurality of images including a respective representation of an object in an environment; predict, based on the plurality of images, a pose of the object in a reference coordinate system associated with the environment; determine, based on the predicted pose of the object in the reference coordinate system, a pose of the object relative to the device; and provide, to a display of the device, virtual content based on the pose of the object relative to the device.

In another example, a non-transitory computer-readable medium is provided that has stored thereon instructions that, when executed by one or more processors, cause the one or more processors to: obtain a plurality of images captured by a camera of a device, each image of the plurality of images including a respective representation of an object in an environment; predict, based on the plurality of images, a pose of the object in a reference coordinate system associated with the environment; determine, based on the predicted pose of the object in the reference coordinate system, a pose of the object relative to the device; and provide, to a display of the device, virtual content based on the pose of the object relative to the device.

In another example, an apparatus for providing virtual content for display is provided. The apparatus includes: means for obtaining a plurality of images captured by a camera of a device, each image of the plurality of images including a respective representation of an object in an environment; means for predicting, based on the plurality of images, a pose of the object in a reference coordinate system associated with the environment; means for determining, based on the predicted pose of the object in the reference coordinate system, a pose of the object relative to the device; and means for providing, to a display of the device, virtual content based on the pose of the object relative to the device.

In some aspects, one or more of the apparatuses described herein is, is part of, and/or includes an extended reality (XR) device or system (e.g., a virtual reality (VR) device, an augmented reality (AR) device, or a mixed reality (MR) device), a mobile device (e.g., a mobile telephone or other mobile device), a wearable device, a wireless communication device, a camera, a personal computer, a laptop computer, a vehicle or a computing device or component of a vehicle, a server computer or server device (e.g., an edge or cloud-based server, a personal computer acting as a server device, a mobile device such as a mobile phone acting as a server device, an XR device acting as a server device, a vehicle acting as a server device, a network router, or other device acting as a server device), another device, or a combination thereof. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors (e.g., one or more inertial measurement units (IMUs), such as one or more gyroscopes, one or more gyrometers, one or more accelerometers, any combination thereof, and/or other sensor.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative examples of the present application are described in detail below with reference to the following figures.

DETAILED DESCRIPTION

Figure 1:
FIG. 1 is a diagram illustrating an example of an extended reality (XR) system, according to aspects of the disclosure.
Figure 1:
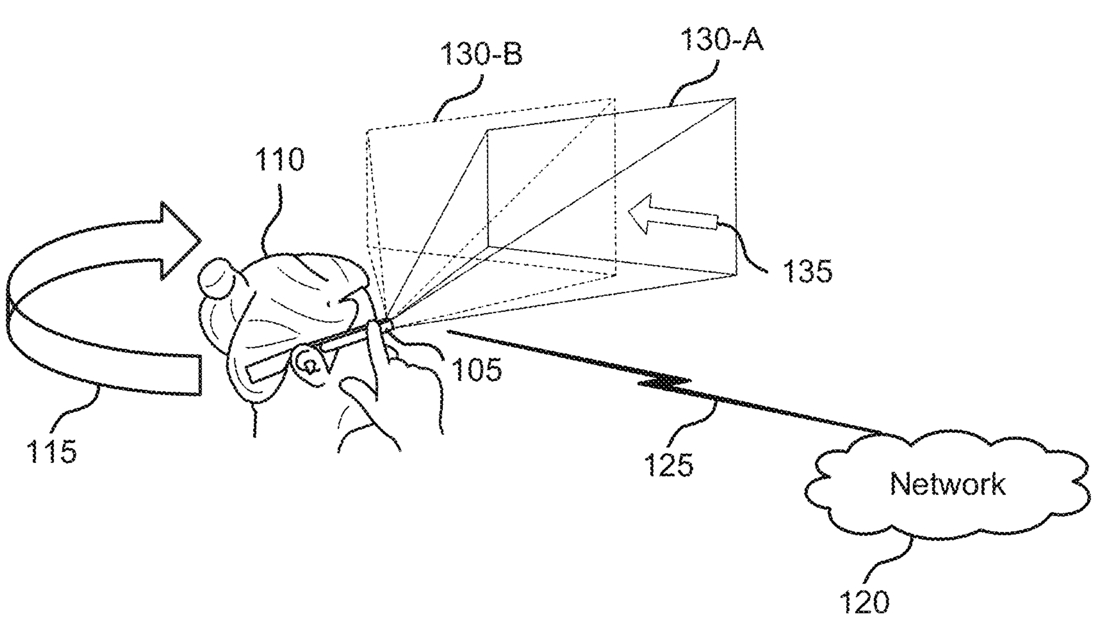

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims.

Extended reality (XR) systems or devices can provide virtual content to a user and/or can combine real-world or physical environments and virtual environments (made up of virtual content) to provide users with XR experiences. The real-world environment can include real-world objects (also referred to as physical objects), such as people, vehicles, buildings, tables, chairs, and/or other real-world or physical objects. XR systems or devices can facilitate interaction with different types of XR environments (e.g., a user can use an XR system or device to interact with an XR environment). XR systems can include virtual reality (VR) systems facilitating interactions with VR environments, augmented reality (AR) systems facilitating interactions with AR environments, mixed reality (MR) systems facilitating interactions with MR environments, and/or other XR systems. Examples of XR systems or devices include head-mounted displays (HMDs), smart glasses, tablets, or smartphones among others. In some cases, an XR system can track parts of the user (e.g., a hand and/or fingertips of a user) to allow the user to interact with items of virtual content.

XR systems can include virtual reality (VR) systems facilitating interactions with VR environments, augmented reality (AR) systems facilitating interactions with AR environments, mixed reality (MR) systems facilitating interactions with MR environments, and/or other XR systems. For instance, VR provides a complete immersive experience in a three-dimensional (3D) computer-generated VR environment or video depicting a virtual version of a real-world environment. VR content can include VR video in some cases, which can be captured and rendered at very high quality, potentially providing a truly immersive virtual reality experience. Virtual reality applications can include gaming, training, education, sports video, online shopping, among others. VR content can be rendered and displayed using a VR system or device, such as a VR HMD or other VR headset, which fully covers a user's eyes during a VR experience.

AR is a technology that provides virtual or computer-generated content (referred to as AR content) over the user's view of a physical, real-world scene or environment. AR content can include any virtual content, such as video, images, graphic content, location data (e.g., global positioning system (GPS) data or other location data), sounds, any combination thereof, and/or other augmented content. An AR system is designed to enhance (or augment), rather than to replace, a person's current perception of reality. For example, a user can see a real stationary or moving physical object through an AR device display, but the user's visual perception of the physical object may be augmented or enhanced by a virtual image of that object (e.g., a real-world car replaced by a virtual image of a DeLorean), by AR content added to the physical object (e.g., virtual wings added to a pig), by AR content displayed relative to the physical object (e.g., informational virtual content displayed near a sign on a building, a virtual monster anchored to (e.g., placed on top of) a real-world table in one or more images, etc.), and/or by displaying other types of AR content. Various types of AR systems can be used for gaming, entertainment, and/or other applications.

MR technologies can combine aspects of VR and AR to provide an immersive experience for a user. For example, in an MR environment, real-world and computer-generated objects can interact (e.g., a real person can interact with a virtual person as if the virtual person were a real person). Additionally or alternatively, MR can include a VR headset with AR capabilities, for instance, an MR system may perform video pass-through (to mimic AR glasses) by passing images (and/or video) of some real-world objects, like a keyboard and/or a monitor, and/or taking real-word geometry (e.g., walls, tables) into account. For example, in a game, the structure of a room can be retextured to according to the game, but the geometry may still be based on the real-world geometry of the room.

In some cases, an XR system can include an optical "see-through" or "pass-through" display (e.g., see-through or pass-through AR HMD or AR glasses), allowing the XR system to display XR content (e.g., AR content) directly onto a real-world view without displaying video content. For example, a user may view physical objects through a display (e.g., glasses or lenses), and the AR system can display AR content onto the display to provide the user with an enhanced visual perception of one or more real-world objects. In one example, a display of an optical see-through AR system can include a lens or glass in front of each eye (or a single lens or glass over both eyes). The see-through display can allow the user to see a real-world or physical object directly, and can display (e.g., projected or otherwise displayed) an enhanced image of that object or additional AR content to augment the user's visual perception of the real world.

XR systems or devices can facilitate interaction with different types of XR environments (e.g., a user can use an XR system or device to interact with an XR environment). One example of an XR environment is a metaverse virtual environment. A user may virtually interact with other users (e.g., in a social setting, in a virtual meeting, etc.), virtually shop for items (e.g., goods, services, property, etc.), to play computer games, and/or to experience other services in a metaverse virtual environment. In one illustrative example, an XR system may provide a 3D collaborative virtual environment for a group of users. The users may interact with one another via virtual representations of the users in the virtual environment. The users may visually, audibly, haptically, or otherwise experience the virtual environment while interacting with virtual representations of the other users.

An XR environment can be interacted with in a seemingly real or physical way. As a user experiencing an XR environment (e.g., an immersive VR environment) moves in the real world, rendered virtual content (e.g., images rendered in a virtual environment in a VR experience) also changes, giving the user the perception that the user is moving within the XR environment. For example, a user can turn left or right, look up or down, and/or move forwards or backwards, thus changing the user's point of view of the XR environment. The XR content presented to the user can change accordingly, so that the user's experience in the XR environment is as seamless as it would be in the real world.

In order to provide and/or display virtual content, XR systems may track the XR system and/or real-world object. Degrees of freedom (DoF) refer to the number of basic ways a rigid object can move through three-dimensional (3D) space. In some cases, XR systems and/or real-world object can be tracked through six different DoF. The six degrees of freedom include three translational degrees of freedom corresponding to translational movement along three perpendicular axes. The three axes can be referred to as x, y, and z axes. The six degrees of freedom include three rotational degrees of freedom corresponding to rotational movement around the three axes, which can be referred to as roll pitch, and yaw.

In the context of systems that track movement through an environment, such as XR systems, degrees of freedom can refer to which of the six degrees of freedom the system is capable of tracking. 3 DoF systems generally track the three rotational DoF-pitch, yaw, and roll. A 3 DoF headset, for instance, can track the user of the headset turning their head left or right, tilting their head up or down, and/or tilting their head to the left or right. 6 DoF systems can track the three translational DoF as well as the three rotational DoF. Thus, a 6 DoF headset, for instance, can track the user moving forward, backward, laterally, and/or vertically in addition to tracking the three rotational DoF.

An XR system may track changes in poses (including translations and changes of orientation (including changes in roll, pitch, and/or yaw)) of respective elements of the XR system (e.g., a display and/or a camera of the XR system) in six DoF. In the present disclosure, the term "pose," and like terms, may refer to position and orientation (including roll, pitch, and yaw). The XR system may relate the poses (e.g., including position and orientation, where orientation can include roll, pitch, and yaw) of the respective elements of the XR system to a reference coordinate system. The reference coordinate system may be stationary and may be associated with the real-world environment in which the XR system is being used. Tracking the poses of the elements of the XR system relative to the reference coordinate system may allow virtual content to be displayed accurately relative to the real-world environment. For example, by tracking a display of the XR system, the XR system may be able to position virtual content in the display, as the display changes pose, such that the virtual content remains stationary in the field of view of a viewer of the display.

In some cases, it may take time to generate and/or display the virtual content. For example, it may take time for a processor to generate or adjust virtual content to be displayed. Further, in some cases, it may take time for the virtual content to be communicated from a processor (e.g., in a computing device) to a display (e.g., in an XR system, such as an HMD). In some cases, the display may change pose while the virtual content is being generated and/or communicated. In order to keep the virtual content in synchronization with the real world (e.g., to keep the virtual content at the correct location within the user's field of view), XR systems may predict changes in pose of the display and may generate content based on a predicted pose of the display rather than based on a "current" or most-recently detected pose of the display.

In some cases, a display of an XR system (e.g., an HMD, AR glasses, etc.) may include one or more inertial measurement units (IMUs) and may use measurements from the IMUs predict a change of pose of the display. Based on the predicted change of pose, the XR system may generate and/or display content in a way that accounts for time taken to generate and/or communicate the virtual content. For example, the XR system may be displaying virtual content at a location on the display that corresponds to a real-world position (e.g., between the user's eyes and the real-world position). Based on input from the IMUs, the XR system may detect a change in pose of the display (e.g., detecting that the user's head, on which the display is worn, is beginning to swivel). Predicting changes of pose of the display may allow the XR system to display the virtual content at the correct location on the display despite processing and/or communication delays. For instance, based on detecting the change in pose of the display, the XR system may generate and/or display the virtual content at a position of the display that changes as the predicted change of pose of the display progresses. The XR system may change the location of the virtual content on the display as the display changes pose such that the virtual content maintains correspondence to the real-world position (e.g., between the user's eye and the real-world position) despite the display changing pose and despite any processing and/or communication time delays.

In some cases, an XR system can track poses of objects in the physical world (e.g., "real-world objects"). For example, an XR system can use tracking information to calculate poses of real-world objects. In some examples, the XR system can use the tracked poses of one or more respective real-world objects to render virtual content relative to the real-world objects in a convincing manner. The pose information can be used to match virtual content with the spatio-temporal state of the real-world objects. As described previously, a pose of a display may be predicted (e.g., corresponding to a predicted head pose), such as using IMU-based (e.g., in 6 DoF) head-pose prediction. Such head pose prediction can be used to account for head motion, but cannot capture motion of images and/or moving objects captured in images.

As described above, it may take time to generate and/or display virtual content. Real-world objects may change pose (including position and/or orientation) during the time it takes to generate and/or display the virtual content. Unless the changes of pose of the real-world objects are accounted for, virtual content displayed relative to the real-world objects may be displayed incorrectly (e.g., related to an old and thus incorrect pose of the real-world objects).

Systems, apparatuses, processes (also referred to as methods), and computer-readable media (collectively referred to as "systems and techniques") are described herein for performing pose prediction of objects for extended reality systems. In some aspects, the systems and techniques may predict a pose (e.g., position and/or orientation) of an object (e.g., a real-world object) and may generate virtual content and/or provide the virtual content for display, in a manner that is based on the predicted pose of the object. For example, real-world objects may change pose over time. The systems and techniques may predict poses of the real-world objects and generate and/or provide virtual content in a way that accounts for the predicted poses of the real-world objects. Predicting poses of the real-world objects and generating and/or providing the virtual content based on the predicted poses allows the systems and techniques to display the virtual content at the correct location of the display and with a correct orientation, despite processing and/or communication delays.

In one illustrative example, an XR system may include one or more cameras (and/or one or more other sensors, including sensors such as, time-of-flight-based sensors, structured-light sensors, light ranging and detection (LIDAR) sensors, any combination thereof, and/or other sensor) and may track one or more real-world objects in a real-world environment based on images captured by the one or more cameras (and/or based on data sensed by the one or more other sensors). The XR system may also include a display used to display virtual content. The XR system may generate and/or provide the virtual content to the display such that the virtual content is displayed at a location of the display that is related to a position of the real-world object in the real-world environment (e.g., at a location of the display that is between the user's eye and the real-world object). For example, the XR system may overlay, in a field of view of the user, virtual content on top of the real-world object (e.g., displaying a virtual DeLorean over a real-world car or virtual wings on a real-world pig). Further, the XR system may generate and/or provide the virtual content to the virtual display such that the virtual content is displayed as having an orientation that is related to the pose of the real-world object (e.g., such that the orientation of the DeLorean corresponds to the orientation of the real-world car).

In order to maintain the virtual content at the correct orientation and at the location of the display that correctly relates to the real-world object as the real-world object changes pose, the systems and techniques described herein can predict poses of the real-world object (e.g., to account for processing and/or communication time). In this way, even though the real-world object may change pose and it may take time for the XR system to generate the virtual content and/or adjust the virtual content to account for the change of pose, the systems and techniques may enable the XR system to display the virtual content at the correct orientation and location (e.g., at locations of the display related to the position real-world object).

In one illustrative example, the systems and techniques may predict poses of a real-world object by inferring the poses using a trained pose-prediction machine-learning model (e.g., including one or more neural-network models or systems). For example, the pose-prediction machine-learning model can be deployed or installed on an XR system. The pose-prediction machine-learning model can be trained using images of objects (e.g., multiple series of images of the objects) moving in a real-world environment relative to one or more cameras used to capture the images. Pose information of the objects (including position and orientation information) corresponding to the series of images can be used as ground truth when training the pose-prediction machine-learning model. The pose information may be relative to a reference coordinate system. In one illustrative example, the reference coordinate system can be a stationary coordinate system, such as a coordinate system associated with an environment (e.g., a world coordinate system). In this way, the pose-prediction machine-learning model may be trained to receive images of an object and, at inference, to provide pose information (in a reference coordinate system) predicting a pose (including a position and an orientation) of the object in the reference coordinate system.

In predicting poses of a display of an XR system (e.g., corresponding to head motion), an XR system may determine or generate a transformation between a device coordinate system (e.g., a coordinate system defined by a position and orientation of the device, or more specifically of the display of the device) and a reference coordinate system (e.g., a stationary coordinate system associated with the environment, such as a world coordinate system). In one illustrative example, a pose of an object relative to the XR system (e.g., referred to as object-to-XR system pose) may be split into two components, including object-to-reference coordinate system pose (or object-to-world pose) and reference coordinate system-to-camera pose (related to the camera of the XR system). The pose-prediction machine-learning model can be used to predict the object-to-reference coordinate system pose for a time between a camera capture of an image and a display refresh of a display of the XR system. The XR system can use the predicted object-to-reference coordinate system pose output by the pose-prediction machine-learning model to render a virtual content (e.g., an augmentation) relative to the object.

The XR system may use the transformation to translate and reorient the predicted pose information of the object into the device coordinate system. The XR system may provide the virtual content (according to the device coordinate system) to the display for display. The location of the display at which the virtual content is displayed may relate to the position of the real-world object in the field of view of the user based on the predicted pose of the of the real-world object.

Various aspects of the application will be described with respect to the figures.

FIG. 1 is a diagram illustrating an example of an extended reality (XR) system 100, according to aspects of the disclosure. As shown, the extended reality system 100 includes a device 105, a network 120, and a communication link 125. In some cases, the device 105 may be an extended reality (XR) device, which may generally implement aspects of extended reality, including virtual reality (VR), augmented reality (AR), mixed reality (MR), etc. Systems including a device 105, a network 120, or other elements in extended reality system 100 may be referred to as extended reality systems.

The device 105 may overlay real-world objects with virtual objects in a view 130 of a user 110. For example, the view 130 may generally refer to visual input to a user 110 via the device 105, a display generated by the device 105, a configuration of virtual objects generated by the device 105, etc. For example, view 130-A may refer to visible real-world objects (also referred to as physical objects) and visible virtual objects, overlaid on or coexisting with the real-world objects, at some initial time. View 130-B may refer to visible real-world objects and visible virtual objects, overlaid on or coexisting with the real-world objects, at some later time. As discussed herein, positional differences in real-world objects (e.g., and thus overlaid virtual objects) may arise from view 130-A shifting to view 130-B at 135 due to head motion 115. In another example, view 130-A may refer to a completely virtual environment or scene at the initial time and view 130-B may refer to the virtual environment or scene at the later time.

Generally, device 105 may generate, display, project, etc. virtual objects and/or a virtual environment to be viewed by a user 110 (e.g., where virtual objects and/or a portion of the virtual environment may be displayed based on user 110 head pose prediction in accordance with the techniques described herein). In some examples, the device 105 may include a transparent surface (e.g., optical glass) such that virtual objects may be displayed on the transparent surface to overlay virtual objects on real word objects viewed through the transparent surface. Additionally or alternatively, the device 105 may project virtual objects onto the real-world environment. In some cases, the device 105 may include a camera and may display both real-world objects (e.g., as frames or images captured by the camera) and virtual objects overlaid on displayed real-world objects. In various examples, device 105 may include aspects of a virtual reality headset, smart glasses, a live feed video camera, a GPU, one or more sensors (e.g., such as one or more IMUs, image sensors, microphones, etc.), one or more output devices (e.g., such as speakers, display, smart glass, etc.), etc.

In some cases, head motion 115 may include user 110 head rotations, translational head movement, etc. The device 105 may update the view 130 of the user 110 according to the head motion 115. For example, the device 105 may display view 130-A for the user 110 before the head motion 115. In some cases, after the head motion 115, the device 105 may display view 130-B to the user 110. The extended reality system (e.g., device 105) may render or update the virtual objects and/or other portions of the virtual environment for display as the view 130-A shifts to view 130-B.

In some cases, the extended reality system 100 may provide various types of virtual experiences, such as a three-dimensional (3D) collaborative virtual environment for a group of users (e.g., including the user 110).

Figure 2:
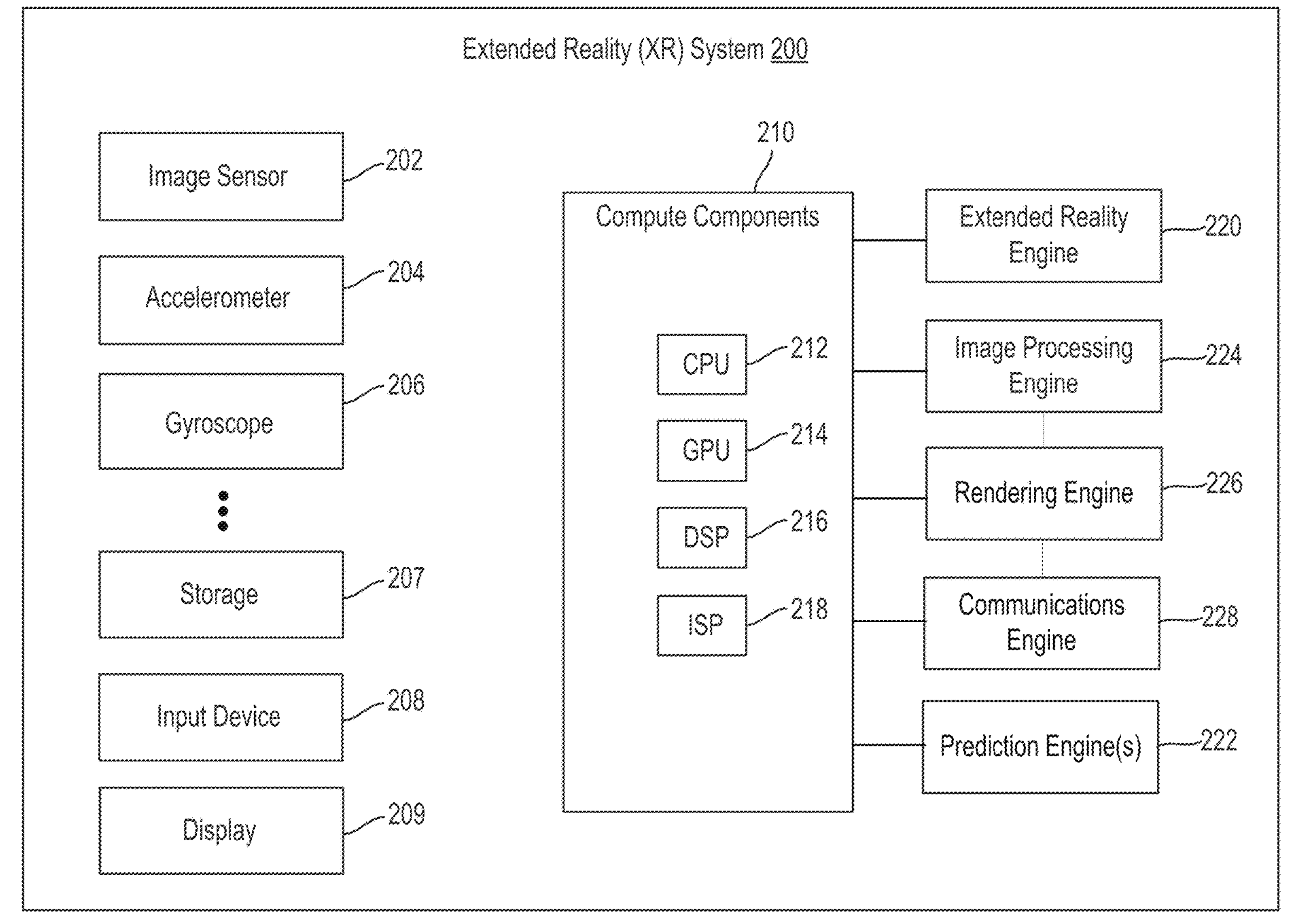
FIG. 2 is a diagram illustrating an architecture of an example XR system, according to aspects of the disclosure.

FIG. 2 is a diagram illustrating an architecture of an example extended reality (XR) system 200, in accordance with some aspects of the disclosure. The XR system 200 can run (or execute) XR applications and implement XR operations. In some examples, the XR system 200 can perform tracking and localization, mapping of an environment in the physical world (e.g., a scene), positioning and rendering of virtual content on a display 209 (e.g., a screen, visible plane/region, and/or other display), prediction of motion of the XR system (e.g., prediction of motion of a display of an HMD or an XR system, and/or prediction of motion of one or more real-world objects, as part of an XR experience. For example, the XR system 200 can generate a map (e.g., a three-dimensional (3D) map) of an environment in the physical world, track a pose (e.g., position and orientation) of the XR system 200 relative to the environment (e.g., relative to the 3D map of the environment), predict a pose of the XR system 200 relative to the environment, position and/or anchor virtual content in a specific position(s) on the map of the environment, predict a pose of a real-world object relative to the environment, and render the virtual content on the display 209 such that the virtual content appears to be at a position in the environment corresponding to the specific position on the map of the scene where the virtual content is positioned and/or anchored. The display 209 can include a glass, a screen, a lens, a projector, and/or other display mechanism that allows a user to see the real-world environment and also allows XR content to be overlaid, overlapped, blended with, or otherwise displayed thereon.

In this illustrative example, the XR system 200 includes one or more image sensors 202, an accelerometer 204, a gyroscope 206, storage 207, compute components 210, an XR engine 220, one or more prediction engines 222, an image processing engine 224, a rendering engine 226, and a communications engine 228. It should be noted that the components 202-228 shown in FIG. 2 are non-limiting examples provided for illustrative and explanation purposes, and other examples can include more, fewer, or different components than those shown in FIG. 2. For example, in some cases, the XR system 200 can include one or more other sensors (e.g., one or more inertial measurement units (IMUs), radars, light detection and ranging (LIDAR) sensors, radio detection and ranging (RADAR) sensors, sound detection and ranging (SODAR) sensors, sound navigation and ranging (SONAR) sensors. audio sensors, etc.), one or more display devices, one more other processing engines, one or more other hardware components, and/or one or more other software and/or hardware components that are not shown in FIG. 2. While various components of the XR system 200, such as the image sensor 202, may be referenced in the singular form herein, it should be understood that the XR system 200 may include multiple of any component discussed herein (e.g., multiple image sensors 202).

The XR system 200 includes or is in communication with (wired or wirelessly) an input device 208. The input device 208 can include any suitable input device, such as a touchscreen, a pen or other pointer device, a keyboard, a mouse a button or key, a microphone for receiving voice commands, a gesture input device for receiving gesture commands, a video game controller, a steering wheel, a joystick, a set of buttons, a trackball, a remote control, any other input device discussed herein, or any combination thereof. In some cases, the image sensor 202 can capture images that can be processed for interpreting gesture commands.

The XR system 200 can also communicate with one or more other electronic devices (wired or wirelessly). For example, communications engine 228 can be configured to manage connections and communicate with one or more electronic devices. In some cases, the communications engine 228 can correspond to the communications interface 840 of FIG. 8.

In some implementations, the one or more image sensors 202, the accelerometer 204, the gyroscope 206, storage 207, compute components 210, XR engine 220, prediction engine(s) 222, image processing engine 224, and rendering engine 226 can be part of the same computing device. For example, in some cases, the one or more image sensors 202, the accelerometer 204, the gyroscope 206, storage 207, compute components 210, XR engine 220, prediction engine(s) 222, image processing engine 224, and rendering engine 226 can be integrated into an HMD, extended reality glasses, smartphone, laptop, tablet computer, gaming system, and/or any other computing device. However, in some implementations, the one or more image sensors 202, the accelerometer 204, the gyroscope 206, storage 207, compute components 210, XR engine 220, prediction engine(s) 222, image processing engine 224, and rendering engine 226 can be part of two or more separate computing devices. For instance, in some cases, some of the components 202-226 can be part of, or implemented by, one computing device and the remaining components can be part of, or implemented by, one or more other computing devices. For example, such as in a split perception XR system, XR system 200 may include a first device (e.g., an HMD), including display 209, image sensor 202, accelerometer 204, gyroscope 206, and/or one or more compute components 210. XR system 200 may also include a second device including additional compute components 210 (e.g., implementing XR engine 220, prediction engine(s) 222, image processing engine 224, rendering engine 226, and/or communications engine 228). In such an example, the second device may generate virtual content based on information or data (e.g., images, sensor data such as measurements from the accelerometer 204 and the gyroscope 206) and may provide the virtual content to the first device for display at the first device. The second device may be, or may include, a mobile device (e.g., a mobile phone or tablet) or another device.

The storage 207 can be any storage device(s) for storing data. Moreover, the storage 207 can store data from any of the components of the XR system 200. For example, the storage 207 can store data from the image sensor 202 (e.g., image or video data), data from the accelerometer 204 (e.g., measurements), data from the gyroscope 206 (e.g., measurements), data from the compute components 210 (e.g., processing parameters, preferences, virtual content, rendering content, scene maps, tracking and localization data, object detection data, privacy data, XR application data, face recognition data, occlusion data, etc.), data from the XR engine 220, data from the prediction engine(s) 222, data from the image processing engine 224, and/or data from the rendering engine 226 (e.g., output frames). In some examples, the storage 207 can include a buffer for storing frames for processing by the compute components 210.

The one or more compute components 210 can include a central processing unit (CPU) 212, a graphics processing unit (GPU) 214, a digital signal processor (DSP) 216, an image signal processor (ISP) 218, and/or other processor (e.g., a neural processing unit (NPU) implementing one or more trained neural networks). The compute components 210 can perform various operations such as image enhancement, computer vision, graphics rendering, extended reality operations (e.g., tracking, localization, pose estimation, mapping, content anchoring, content rendering, predicting, etc.), image and/or video processing, sensor processing, recognition (e.g., text recognition, facial recognition, object recognition, feature recognition, tracking or pattern recognition, scene recognition, occlusion detection, etc.), trained machine-learning operations, filtering, and/or any of the various operations described herein. In some examples, the compute components 210 can implement (e.g., control, operate, etc.) the XR engine 220, the prediction engine(s) 222, the image processing engine 224, and the rendering engine 226. In other examples, the compute components 210 can also implement one or more other processing engines.

The image sensor 202 can include any image and/or video sensors or capturing devices. In some examples, the image sensor 202 can be part of a multiple-camera assembly, such as a dual-camera assembly. The image sensor 202 can capture image and/or video content (e.g., raw image and/or video data), which can then be processed by the compute components 210, the XR engine 220, the prediction engine(s) 222, the image processing engine 224, and/or the rendering engine 226 as described herein.

In some examples, the image sensor 202 can capture image data and can generate images (also referred to as frames) based on the image data and/or can provide the image data or frames to the XR engine 220, the prediction engine(s) 222, the image processing engine 224, and/or the rendering engine 226 for processing. An image or frame can include a video frame of a video sequence or a still image. An image or frame can include a pixel array representing a scene. For example, an image can be a red-green-blue (RGB) image having red, green, and blue color components per pixel; a luma, chroma-red, chroma-blue (YCbCr) image having a luma component and two chroma (color) components (chroma-red and chroma-blue) per pixel; or any other suitable type of color or monochrome image.

In some cases, the image sensor 202 (and/or other camera of the XR system 200) can be configured to also capture depth information. For example, in some implementations, the image sensor 202 (and/or other camera) can include an RGB-depth (RGB-D) camera. In some cases, the XR system 200 can include one or more depth sensors (not shown) that are separate from the image sensor 202 (and/or other camera) and that can capture depth information. For instance, such a depth sensor can obtain depth information independently from the image sensor 202. In some examples, a depth sensor can be physically installed in the same general location or position as the image sensor 202, but may operate at a different frequency or frame rate from the image sensor 202. In some examples, a depth sensor can take the form of a light source that can project a structured or textured light pattern, which may include one or more narrow bands of light, onto one or more objects in a scene. Depth information can then be obtained by exploiting geometrical distortions of the projected pattern caused by the surface shape of the object. In one example, depth information may be obtained from stereo sensors such as a combination of an infra-red structured light projector and an infra-red camera registered to a camera (e.g., an RGB camera).

The XR system 200 can also include other sensors in its one or more sensors. The one or more sensors can include one or more accelerometers (e.g., accelerometer 204), one or more gyroscopes (e.g., gyroscope 206), and/or other sensors. The one or more sensors can provide velocity, orientation, and/or other position-related information to the compute components 210. For example, the accelerometer 204 can detect acceleration by the XR system 200 and can generate acceleration measurements based on the detected acceleration. In some cases, the accelerometer 204 can provide one or more translational vectors (e.g., up/down, left/right, forward/back) that can be used for determining a position or pose of the XR system 200. The gyroscope 206 can detect and measure the orientation and angular velocity of the XR system 200. For example, the gyroscope 206 can be used to measure the pitch, roll, and yaw of the XR system 200. In some cases, the gyroscope 206 can provide one or more rotational vectors (e.g., pitch, yaw, roll). In some examples, the image sensor 202 and/or the XR engine 220 can use measurements obtained by the accelerometer 204 (e.g., one or more translational vectors) and/or the gyroscope 206 (e.g., one or more rotational vectors) to calculate the pose of the XR system 200. As previously noted, in other examples, the XR system 200 can also include other sensors, such as an inertial measurement unit (IMU), a magnetometer, a gaze and/or eye tracking sensor, a machine vision sensor, a smart scene sensor, a speech recognition sensor, an impact sensor, a shock sensor, a position sensor, a tilt sensor, etc.

As noted above, in some cases, the one or more sensors can include at least one IMU. An IMU is an electronic device that measures the specific force, angular rate, and/or the orientation of the XR system 200, using a combination of one or more accelerometers, one or more gyroscopes, and/or one or more magnetometers. In some examples, the one or more sensors can output measured information associated with the capture of an image captured by the image sensor 202 (and/or other camera of the XR system 200) and/or depth information obtained using one or more depth sensors of the XR system 200.

The output of one or more sensors (e.g., the accelerometer 204, the gyroscope 206, one or more IMUs, and/or other sensors) can be used by the XR engine 220 to determine a pose of the XR system 200 (also referred to as the head pose) and/or the pose of the image sensor 202 (or other camera of the XR system 200). In some cases, the pose of the XR system 200 and the pose of the image sensor 202 (or other camera) can be the same. The pose of image sensor 202 refers to the position and orientation of the image sensor 202 relative to a frame of reference (e.g., with respect to the view 130-A or 130-B). In some implementations, the camera pose can be determined for 6-Degrees Of Freedom (6 DoF), which refers to three translational components (e.g., which can be given by X (horizontal), Y (vertical), and Z (depth) coordinates relative to a frame of reference, such as the image plane) and three angular components (e.g. roll, pitch, and yaw relative to the same frame of reference). In some implementations, the camera pose can be determined for 3-Degrees Of Freedom (3 DoF), which refers to the three angular components (e.g. roll, pitch, and yaw).

In some cases, a device tracker (not shown) can use the measurements from the one or more sensors and image data from the image sensor 202 to track a pose (e.g., a 6 DoF pose) of the XR system 200. For example, the device tracker can fuse visual data (e.g., using a visual tracking solution) from the image data with inertial data from the measurements to determine a position and motion of the XR system 200 relative to the physical world (e.g., the scene) and a map of the physical world. As described below, in some examples, when tracking the pose of the XR system 200, the device tracker can generate a three-dimensional (3D) map of the scene (e.g., the real world) and/or generate updates for a 3D map of the scene. The 3D map updates can include, for example and without limitation, new or updated features and/or feature or landmark points associated with the scene and/or the 3D map of the scene, localization updates identifying or updating a position of the XR system 200 within the scene and the 3D map of the scene, etc. The 3D map can provide a digital representation of a scene in the real/physical world. In some examples, the 3D map can anchor position-based objects and/or content to real-world coordinates and/or objects. The XR system 200 can use a mapped scene (e.g., a scene in the physical world represented by, and/or associated with, a 3D map) to merge the physical and virtual worlds and/or merge virtual content or objects with the physical environment.

In some aspects, the pose of image sensor 202 and/or the XR system 200 as a whole can be determined and/or tracked by the compute components 210 using a visual tracking solution based on images captured by the image sensor 202 (and/or other camera of the XR system 200). For instance, in some examples, the compute components 210 can perform tracking using computer vision-based tracking, model-based tracking, and/or simultaneous localization and mapping (SLAM) techniques. For instance, the compute components 210 can perform SLAM or can be in communication (wired or wireless) with a SLAM system (not shown). SLAM refers to a class of techniques where a map of an environment (e.g., a map of an environment being modeled by XR system 200) is created while simultaneously tracking the pose of a camera (e.g., image sensor 202) and/or the XR system 200 relative to that map. The map can be referred to as a SLAM map, and can be three-dimensional (3D). The SLAM techniques can be performed using color or grayscale image data captured by the image sensor 202 (and/or other camera of the XR system 200), and can be used to generate estimates of 6 DoF pose measurements of the image sensor 202 and/or the XR system 200. Such a SLAM technique configured to perform 6 DoF tracking can be referred to as 6 DoF SLAM. In some cases, the output of the one or more sensors (e.g., the accelerometer 204, the gyroscope 206, one or more IMUs, and/or other sensors) can be used to estimate, correct, and/or otherwise adjust the estimated pose.

In some aspects, the pose of image sensor 202, display 209, and/or the XR system 200 as a whole can be predicted by compute components 210 (e.g., implementing prediction engine(s) 222) based on data from one or more sensors (e.g., the accelerometer 204, the gyroscope 206, one or more IMUs, and/or image sensor 202). For example, prediction engine(s) 222 may use a machine-learning model to predict a pose of display 209 (e.g., corresponding to a head pose of a user of the XR system 200) using data output by accelerometer 204, gyroscope 206, and/or image sensor 202. Further, as described in more detail with regard to FIG. 3 and FIG. 5, compute components 210 (e.g., implementing prediction engine(s) 222) may predict poses of a real-world object captured in images by image sensor 202. For example, prediction engine(s) 222 may use a pose-prediction machine-learning model to predict positions of the real-world object based on images from image sensor 202.

In some aspects, the pose of one or more real-world objects can be predicted by the compute components 210 based on data from image sensor 202. For example, a pose-prediction machine-learning model may be used to predict a pose of the one or more real-world objects based on images from image sensor 202.

In some cases, the XR system 200 can also track the hand and/or fingers of the user to allow the user to interact with and/or control virtual content in a virtual environment. For example, the XR system 200 can track a pose and/or movement of the hand and/or fingertips of the user to identify or translate user interactions with the virtual environment. The user interactions can include, for example and without limitation, moving an item of virtual content, resizing the item of virtual content, selecting an input interface element in a virtual user interface (e.g., a virtual representation of a mobile phone, a virtual keyboard, and/or other virtual interface), providing an input through a virtual user interface, etc.

Additionally or alternatively, compute components may provide virtual content to display 209 for display. Display 209 can display the virtual content. Providing the virtual content for display may include transmitting (either wired or wirelessly) a signal representative of the virtual content. The signal may be formatted such that the virtual content is rendered at a location of the display that corresponds to an intended position of the virtual content within a field of view of the user.

Figure 3:
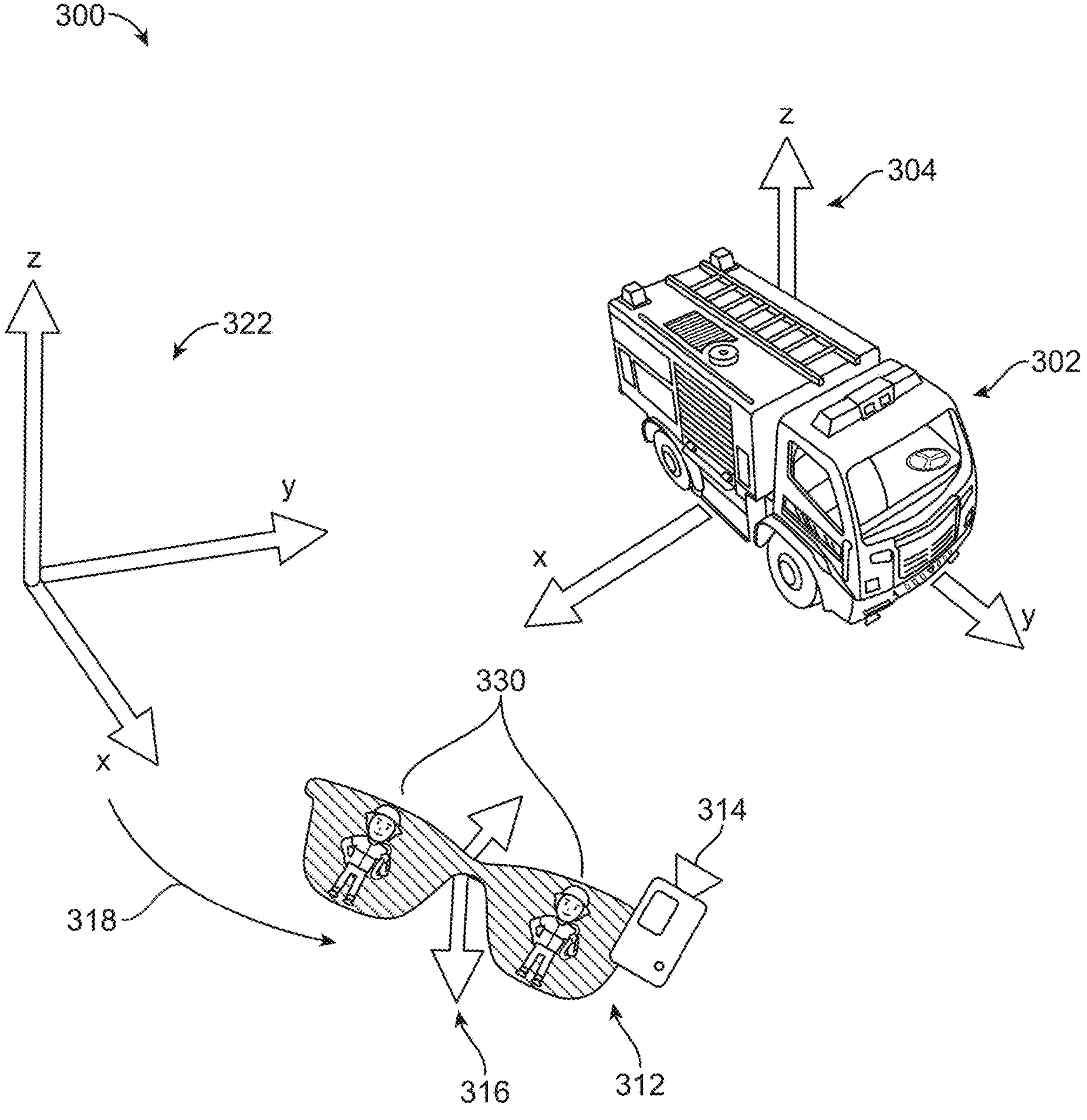
FIG. 3 illustrates an example environment including a real-world object and an example display according to aspects of the disclosure.

FIG. 3 illustrates an example environment 300 including a real-world object 302 and an example display 312 according to aspects of the disclosure. According to aspects described herein, an XR system, (e.g., XR system 200), an XR device, or a component (e.g., a chipset, one or more processors, etc.) of the XR device or XR system, may predict a pose of object 302 in a reference coordinate system (e.g., in a world reference system, which can be referred to as an object-to-world pose of the object 302) and may generate virtual content 330 and/or provide the virtual content 330 for display at display 312 in a manner that is based on the predicted pose of object 302. In some cases, the XR system or device can include the display 312. For example, object 302 may change pose (which change of pose may include a change in position and/or a change in orientation). The XR system may predict the pose of object 302 and may generate and/or provide virtual content 330 to display 312 in a manner that accounts for the predicted pose of object 302. Predicting the pose of object 302 and generating and/or providing the virtual content 330 based on the predicted pose allows the XR system to display virtual content 330 at the correct location at display 312, and having the correct orientation, despite processing and/or communication delays in generating and/or communicating the virtual content 330.

For example, an XR system including display 312 may also include a camera 314. The XR system may track object 302 using images captured by camera 314. The XR system may generate and/or provide for display, at display 312, virtual content 330 having a pose that is related to a pose of object 302. For example, the XR system may generate virtual content 330, and provide virtual content 330 for display at a location of display 312, that is related to a pose of object 302 in the real world (e.g., at a location of display 312 that is between a user's eye and the object 302). For example, the XR system may overlay, in a field of view of the user, virtual content on top of object 302 (e.g., displaying firemen riding on or driving object 302). Additionally or alternatively, XR system may display virtual content, in a field of view of the user, in relation to object 302 (e.g., displaying a virtual dalmatian that may chase after object 302). Additionally, the XR system may generate and/or provide for display virtual content 330 having an orientation that is related to a pose of object 302 in the real world (e.g., virtual content 330 may be oriented in a way that relates to the orientation of object 302 e.g., such that the fireman is oriented facing in the direction the firetruck is driving).

In order to keep virtual content 330 at the correct orientation and at the correct location of display 312 (e.g., the orientation and location that correctly relates to object 302 from the perspective of display 312) as object 302 changes pose, the XR system may predict the pose of object 302 (e.g., to account for processing and/or communication delays). In this way, even though object 302 may change pose, and even though it may take time for the XR system to generate the virtual content 330 and/or adjust the virtual content 330 to account for the changes in pose of object 302, the device may enable the XR system to display virtual content 330 at the correct orientation and location (e.g., at locations related to object 302).

The XR system may predict the pose of object 302 using a trained pose-prediction machine-learning model. The pose-prediction machine-learning model may be, or may include, a neural network model similar to or the same as neural network 600 as described with regard to FIG. 6, a neural network model similar to or the same as convolutional neural network 700 as described with regard to FIG. 7, or using another type of neural network mode. The pose-prediction machine-learning model can be trained using a process similar to, or the same as, the process described with relation to training machine-learning model 410 of FIG. 4 or training neural network 600 of FIG. 6.

Figure 4:
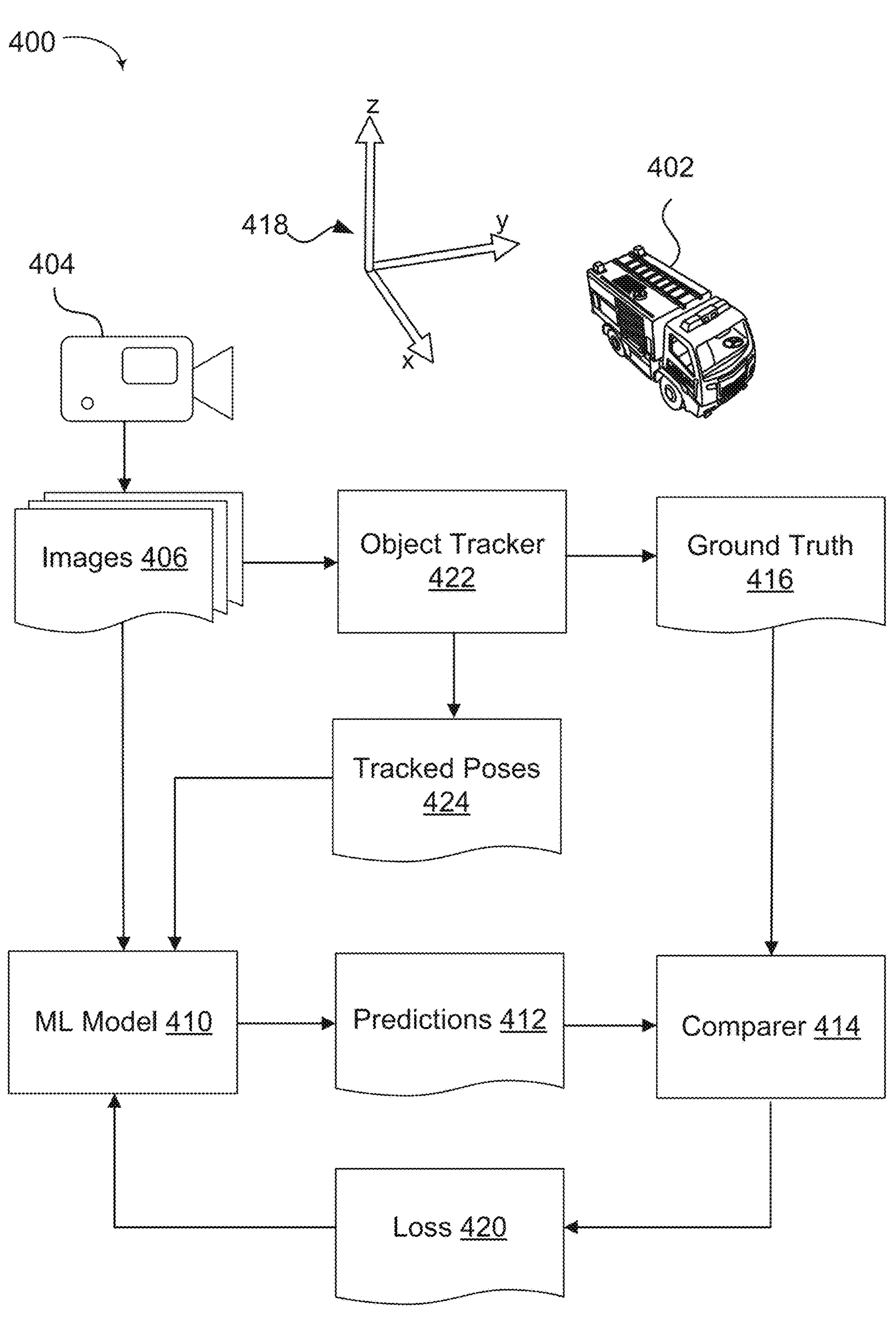
FIG. 4 is a diagram illustrating an example of a system, according to aspects of the disclosure.

FIG. 4 illustrates a system 400 for training a machine-learning model 410 (which may be an example of a pose-prediction machine-learning model, such as the pose-prediction machine-learning model discussed above), according to various aspects disclosed herein. System 400 may train machine-learning model 410 through a backpropagation process involving providing machine-learning model 410 with inputs (e.g., images 406 and/or tracked poses 424), comparing outputs (e.g., predictions 412) of machine-learning model 410 with ground truth 416, and adjusting machine-learning model 410 such that in further iterations of the backpropagation process, further outputs (e.g., predictions 412) of machine-learning model 410 are closer to ground truth 416.

For example, an object 402 may be located in an environment with a particular pose (e.g., at a particular position and orientation in the environment). A camera 404 may capture images 406 of object 402 as the pose of object 402 changes. Images 406 may include series of images 406, for example, a first image captured at a first time of object 402 in a first pose, a second image captured at a second time of 402 of object 402 in a second pose, and so on. The second time may occur soon after (e.g., a number of milliseconds, or less, after) the first time. Images 406 may include a series of images 406 of object 402 changing pose over time.

In some cases, system 400 may include an object tracker 422, which may determine tracked poses 424 based on images 406 of object 402. Object tracker 422 may be, or may include, a machine-learning model (e.g., an object-tracking model) trained to determine a pose of an object (e.g., object 402) in an image (e.g., one of images 406). Object tracker 422 may determine tracked poses 424 according to a coordinate system of camera 404. In other words, object tracker 422 may receive images 406 (including object 402) as input and determine, a pose of object 402 in each of the images 406.

Additionally, ground truth 416 may be obtained (e.g., from a motion-capture system). Ground truth 416 may include pose data (including position and orientation data) of object 402. Ground truth 416 may correspond to images 406 (and/or to tracked poses 424). For example, for each image of images 406 (and/or each of tracked poses 424), ground truth 416 may include a pose of object 402 at a time the image was captured. Ground truth 416 can include pose information indicating the pose of object 402 in a reference coordinate system 418, which may be a world coordinate system. Reference coordinate system 418 may be stationary, for example, even if camera 404 changes pose between capturing images 406. Ground truth 416 may track a pose of object 402 with respect to reference coordinate system 418, which may remain stationary or constant as note above.

Additionally or alternatively, instead of ground truth 416 being captured and provided by a motion-capture system, in some cases, object tracker 422 may determine and provide ground truth 416. In such cases, object tracker 422 may transform tracked poses 424 from a camera coordinate system to the reference coordinate system 418 and provide the transformed tracked poses 424 as ground truth 416.

Images 406 (and/or tracked poses 424) may be provided to machine-learning model 410 and machine-learning model 410 may generate predictions 412 based on images 406 (and/or tracked poses 424). Predictions 412 may include one or more predicted poses of object 402. For example, machine-learning model 410 may process the images 406 of object 402 (and/or tracked poses 424) and to generate predictions 412 of one or more upcoming poses of object 402 following the poses of object 402 represented in the series of images 406 (and/or tracked poses 424).

A comparer 414 may compare predictions 412 with ground truth 416 and determine a loss 420 representative of a difference between predictions 412 and ground truth 416. Loss 420 may represent a difference between a predicted pose of object 402 of predictions 412 and a recorded pose of object 402 of ground truth 416.

Machine-learning model 410 may adjust parameters of machine-learning model 410 (e.g., adjusting weights between layers of a neural network of machine-learning model 410) based on loss 420 to seek to minimize loss 420 of further predictions 412 (e.g., using a gradient-descent technique). Initially, when machine-learning model 410 is untrained, predictions 412 may not be close to ground truth 416. Through successive iterations of adjusting the parameters of machine-learning model 410 based on loss 420, predictions 412 may become closer to ground truth 416.

Because ground truth 416 includes pose data of object 402 defined according to reference coordinate system 418, predictions 412 also includes pose data of object 402 defined according to reference coordinate system 418. When machine-learning model 410 is used to infer pose data, machine-learning model 410 will infer pose data according to reference coordinate system 418.

Returning to FIG. 3, an object coordinate system 304 is defined with respect to object 302. For example, object coordinate system 304 may be defined having object 302 at its center and extending in three mutually perpendicular directions (illustrated as "x," "y," and "z") from object 302. Object coordinate system 304 may move with object 302. For example, object 302 may always be at the center (e.g., at coordinates (0,0,0)) of object coordinate system 304. Further, object coordinate system 304 may reorient with object 302 (e.g., such that one side of object 302 may always align with the positive y-axis).

A device coordinate system 316 is also illustrated in FIG. 3. Device coordinate system 316 may be defined with respect to display 312. For example, device coordinate system 316 may be defined having display 312 at its center and extending in three mutually perpendicular directions (illustrated as "x," "y," and "z") from display 312. Device coordinate system 316 may move with display 312. For example, display 312 may always be at the center (e.g., (0,0,0)) of device coordinate system 316. Further, device coordinate system 316 may reorient with display 312 (e.g., such that the positive z-direction always corresponds do directly in front of display 312).

A reference coordinate system 322 is also illustrated in FIG. 3, which may be associated with a real-world environment of object 302. Reference coordinate system 322 may be stationary, similar to that described above with respect to FIG. 4. Reference coordinate system 322 being "stationary" may mean that reference coordinate system 322 may not translate or reorient. Object coordinate system 304 and device coordinate system 316 may translate and/or reorient as object 302 and display 312, respectively change pose. Reference coordinate system 322 may not translate or reorient and may be a constant frame of reference through which object coordinate system 304 may be related to device coordinate system 316. In some cases, the reference coordinate system 322 can be referred to as a world coordinate system.

Any point in the environment can be defined according to any of object coordinate system 304, device coordinate system 316, or reference coordinate system 322. For example, a position of display 312 may be defined as (0,0,0) according to device coordinate system 316 or as (24,2,4) according to reference coordinate system 322. Additionally, any orientation in the environment can be defined according to any of object coordinate system 304, device coordinate system 316, or reference coordinate system 322.

An XR system can perform a transformation 318 to translate and reorient points defined according to reference coordinate system 322 to be defined according to device coordinate system 316. For example, the XR system may have pose information representative of a pose of object 302 defined according to reference coordinate system 322. The XR system may use transformation 318 on the pose of object 302 according to reference coordinate system 322 to obtain a description of the pose of object 302 according device coordinate system 316.

In some aspects, transformation 318 may be, or may include, a matrix (e.g., a 4-dimensional matrix including a translation matrix and three rotation matrices) and transforming a point defined according to reference coordinate system 322 to the being defined according to device coordinate system 316 may include multiplying coordinates of the point in reference coordinate system 322 by the matrix. The XR system may track and/or predict a pose of display 312 (e.g., based on data from IMUs included in an HMD). The XR system may generate transformation 318. Further, the XR system may update transformation 318 as display 312 changes pose (e.g., based on a detected or predicted change of pose of display 312). For example, as a pose of display 312 changes, the XR system may update transformation 318 by recalculating transformation 318 using the changed position of display 312 defined according to reference coordinate system 322 in the recalculation.

The XR system may provide one or more captured images (e.g., captured by camera 314) and/or one or more poses of object 302 (e.g., past known poses of object 302 as determined by an object tracker) to the trained pose-prediction machine-learning model. For example, the device may provide the most-recently captured images of object 302 (e.g., according to a frame-capture rate of camera 314) and/or corresponding past known poses (e.g., most-recently determined poses) of object 302 to the pose-prediction machine-learning model. The pose-prediction machine-learning model may infer predictions regarding one or more future poses of object 302 (e.g., according to a refresh rate of display 312). In some cases, the XR system may interpolate between the two or more predicted poses of object 302 to determine a single predicted pose of object 302. For example, the pose-prediction machine-learning model may generate four pose predictions (e.g., corresponding to four cycles of the refresh rate of display 312). The XR system may interpolate between the four pose predictions to determine a single predicted pose. Interpolating between pose predictions may provide a more accurate pose prediction. The XR system may generate or alter virtual content 330 based on the predicted pose.

Additionally or alternatively, the XR system may provide poses of object 302, (e.g., the most recent known poses of object 302) as input to the machine-learning model. These poses may be determined by an object tracker that may estimate the pose of object 302 relative to the camera 314. The XR system may, based on the pose information of an environment, use the camera, the environment, or the most recently determined object pose, as the reference of the recent object poses. The machine-learning model may provide, as an output, a sequence of relative poses representing the recent relative motion trajectory, or combinations thereof. For example, The XR system may reference the sequence of recent object poses to the last known pose, resulting in the most recently known relative motion trajectory. The machine-learning model may then predict the evolution of the relative trajectory, on which the last known pose of object 302 in the reference coordinate system 322 to get the predicted poses of the object 302 in the reference coordinate system 322.

Because the pose-prediction machine-learning model was trained using ground truth data defined according to a reference coordinate system (which reference coordinate system may be related to reference coordinate system 322), the pose-prediction machine-learning model may predict the one or more positions of object 302 in reference coordinate system 322. The XR system may use transformation 318 to translate and rotate the predicted position of object 302 into device coordinate system 316 such that display 312 may display virtual content 330.

After translating and rotating virtual content 330 using transformation 318, the XR system may provide the translated and rotated virtual content 330 for display by display 312. For example, the XR system can provide the virtual content 330 to display 312 according to the device coordinate system 316 such that display 312 may display virtual content 330. Because the pose of object 302 was predicted, when the virtual content 330 is displayed, the location of display 312 at which virtual content 330 is displayed may relate to the location of object 302 in the field of view of view of the user despite object 302 having changed pose while virtual content 330 was generated and/or communicated. Further, because the XR system may track and/or predict a pose of display 312 and may update transformation 318 based on the pose of display 312, the device may provide virtual content 330 to display 312 in a manner that accounts for changes of pose of display 312.

Using the techniques described herein, the XR system may use the trained pose-prediction machine-learning model to predict a pose of object 302 to account for changes of pose of object 302. The XR system may use IMUs and a separate prediction system to account for changes in pose of display 312. Transformation 318 may relate the predicted pose of 302 (from the trained pose-prediction machine-learning model) to the predicted pose of display 312 such that the XR system can display virtual content 330 at display 312 in a manner that accounts for changes of pose of object 302 and changes of pose of display 312.

Figure 5:
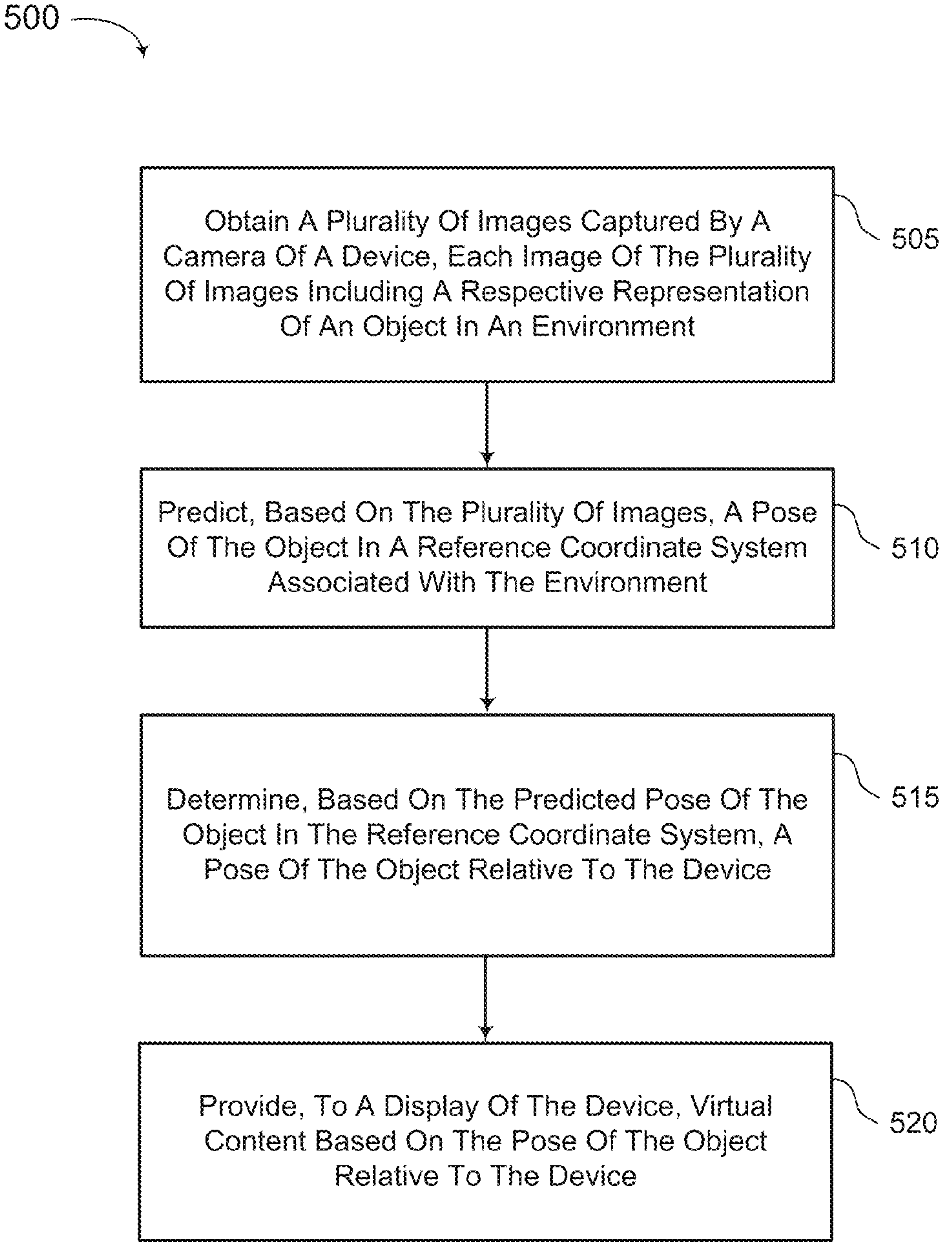
FIG. 5 is a flow diagram illustrating an example of a process of providing virtual content to a display, according to aspects of the disclosure.

FIG. 5 illustrates an example of a process 500 for providing virtual content for display, according to aspects of the disclosure. The process 500 may be performed by a computing device (or apparatus) or a component (e.g., a chipset, one or more processors, etc.) of the computing device. The computing device may be an extended reality (XR) device (e.g., a virtual reality (VR) device or augmented reality (AR) device), a mobile device (e.g., a mobile phone), a network-connected wearable such as a watch, and/or other type of computing device. The operations of the process 500 may be implemented as software components that are executed and run on one or more compute components or processors (e.g., the compute components 210 of FIG. 2, such as the CPU 212, the GPU 214, the DSP 216, and/or the ISP 218, the processor 810 of FIG. 8, or other processor(s)). Transmission and reception of signals by the computing device in the process 500 may be enabled, for example, by one or more antennas, one or more transceivers (e.g., wireless transceiver(s)), and/or other communication components (e.g., the communication interface 840 of FIG. 8, or other antennae(s), transceiver(s), and/or component(s)).

At block 505, the computing device (or one or more components thereof) can obtain a plurality of images captured by a camera of a device. Each image of the plurality of images may include a respective representation of an object in an environment. For example, camera 314 may capture a plurality of images of object 302 in the environment. Display 312 may provide the plurality of images to the computing device (or one or more components thereof). In some aspects, the device may include an extended-reality device. In some cases, the device may include a see-through extended-reality device. In some examples, the device may be a display of the extended-reality device (or the see-through extended-reality device). The device may be part of an extended-reality system including the computing device.

At block 510, the computing device (or one or more components thereof) can predict, based on the plurality of images, a pose of the object in a reference coordinate system associated with the environment. For example, the computing device (or one or more components thereof) can predict a pose of object 302 in a reference coordinate system 322. In some aspects, to predict the pose of the object (e.g., at block 510), the computing device (or one or more components thereof) can infer, using a trained pose-prediction machine-learning model, the predicted pose of the object in the reference coordinate system based on the plurality of images. In some cases, the predicted pose of the object (e.g., the pose predicted at block 510) in the reference coordinate system is further based on previously-determined poses of the object. In some examples, to predict the pose of the object (e.g., at block 510), the computing device (or one or more components thereof) can predict a number of future poses of the object at a number of respective future times and predicting the pose of the object based on interpolating between the predicted number of future poses.

At block 515, the computing device (or one or more components thereof) can determine, based on the predicted pose of the object in the reference coordinate system, a pose of the object relative to the device. For example, the computing device (or one or more components thereof) can determine a pose of object 302 in device coordinate system 316 based on the predicted pose and reference coordinate system 322. In some aspects, to determine the pose of the object relative to the device (e.g., at block 515), the computing device (or one or more components thereof) can obtain a transformation between the reference coordinate system and a device coordinate system associated with an orientation of the device. The computing device (or one or more components thereof) can apply the transformation to the predicted pose of the object. In some cases, the transformation may be based on a head-pose prediction model.

At block 520, the computing device (or one or more components thereof) can provide, to a display of the device, virtual content based on the pose of the object relative to the device. For example, the computing device (or one or more components thereof) can provide virtual content 330 to display 312 based on the pose of object 302 relative to display 312.

In some aspects, the plurality of images captured by the camera may include the object and the environment from a perspective of the camera. According to these or other aspects, process 500 may further include displaying the virtual content at a location of the display that is related to a pose of the object within a line of sight of a user of the device according to an orientation of the device and a position of the device. For example, camera 314 may capture images of object 302 from a perspective of camera 314. Further, display 312 can display virtual content 330 at a location of display 312 that is related to a pose of object 302 within a line of sight of a user of display 312.

In some cases, the devices or apparatuses configured to perform the operations of the process 500 and/or other processes described herein may include a processor, microprocessor, microcomputer, or other component of a device that is configured to carry out the steps of the process 500 and/or other process. In some examples, such devices or apparatuses may include one or more sensors configured to capture image data and/or other sensor measurements. In some examples, such computing device or apparatus may include one or more sensors and/or a camera configured to capture one or more images or videos. In some cases, such device or apparatus may include a display for displaying images. In some examples, the one or more sensors and/or camera are separate from the device or apparatus, in which case the device or apparatus receives the sensed data. Such device or apparatus may further include a network interface configured to communicate data.

The components of the device or apparatus configured to carry out one or more operations of the process 500 and/or other processes described herein can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The computing device may further include a display (as an example of the output device or in addition to the output device), a network interface configured to communicate and/or receive the data, any combination thereof, and/or other component(s). The network interface may be configured to communicate and/or receive Internet Protocol (IP) based data or other type of data.

The process 500 is illustrated as a logical flow diagram, the operations of which represent sequences of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes described herein (e.g., the process 500 and/or other processes) may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program including a plurality of instructions executable by one or more processors. The computer-readable or machine-readable storage medium may be non-transitory.

Figure 6:
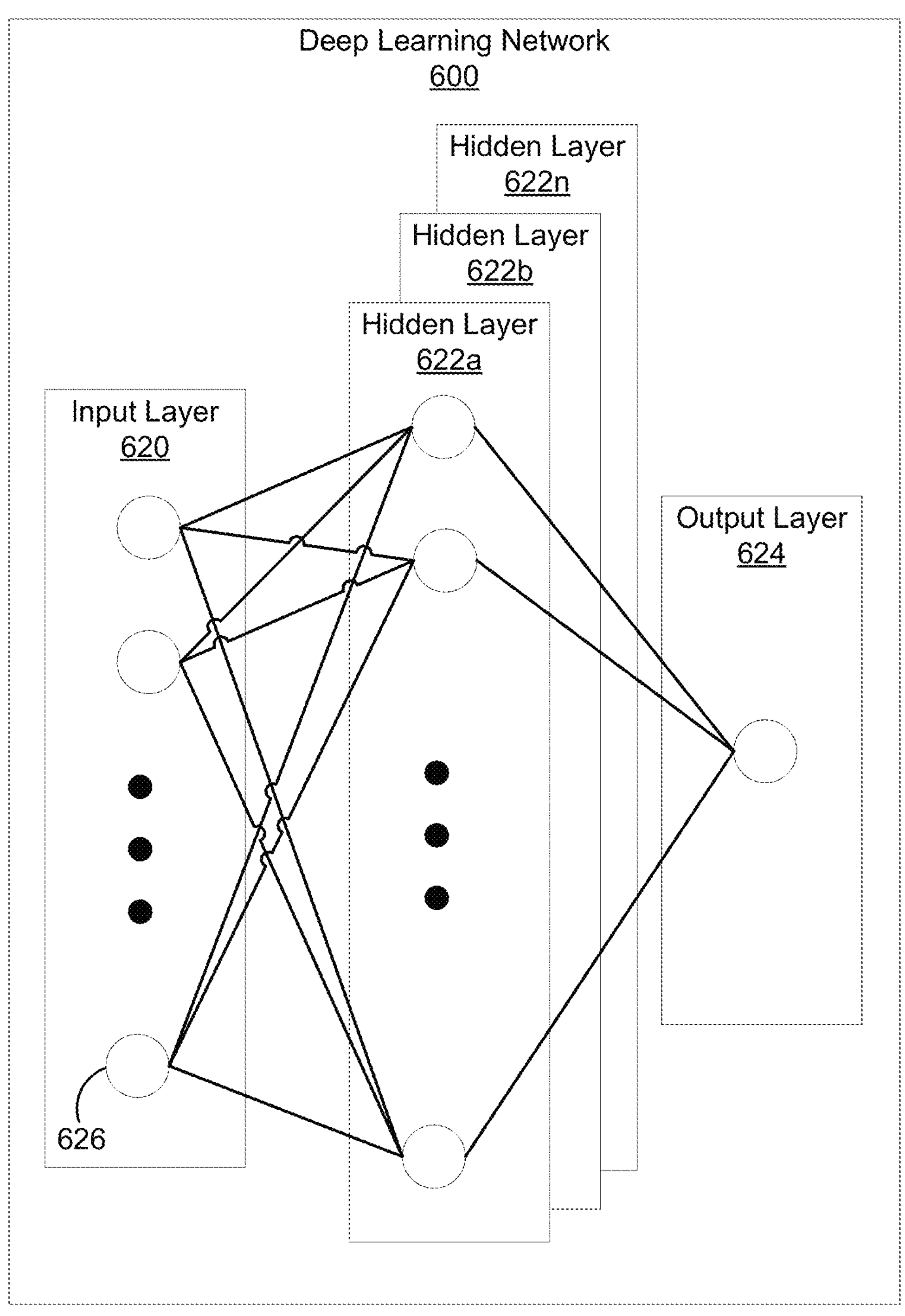
FIG. 6 is a block diagram illustrating an example of a deep learning network, according to aspects of the disclosure.

As described herein, various aspects may be implemented using a deep network, such as a neural network or multiple neural networks. FIG. 6 is an illustrative example of a deep learning neural network 600 that can be used by a 3D model training system according to aspects of the disclosure. An input layer 620 includes input data. In one illustrative example, the input layer 620 can include data representing the pixels of an input video frame. The neural network 600 includes multiple hidden layers 622*a*, 622*b*, through 622*n*. The hidden layers 622*a*, 622*b*, through 622*n* include "n" number of hidden layers, where "n" is an integer greater than or equal to one. The number of hidden layers can be made to include as many layers as needed for the given application. The neural network 600 further includes an output layer 624 that provides an output resulting from the processing performed by the hidden layers 622*a*, 622*b*, through 622*n*. In one illustrative example, the output layer 624 can provide a classification for an object in an input video frame. The classification can include a class identifying the type of object (e.g., a person, a dog, a cat, or other object).

The neural network 600 is a multi-layer neural network of interconnected nodes. Each node can represent a piece of information. Information associated with the nodes is shared among the different layers and each layer retains information as information is processed. In some cases, the neural network 600 can include a feed-forward network, in which case there are no feedback connections where outputs of the network are fed back into itself. In some cases, the neural network 600 can include a recurrent neural network, which can have loops that allow information to be carried across nodes while reading in input.

Information can be exchanged between nodes through node-to-node interconnections between the various layers. Nodes of the input layer 620 can activate a set of nodes in the first hidden layer 622*a*. For example, as shown, each of the input nodes of the input layer 620 is connected to each of the nodes of the first hidden layer 622*a*. The nodes of the hidden layers 622*a*, 622*b*, through 622*n* can transform the information of each input node by applying activation functions to the information. The information derived from the transformation can then be passed to and can activate the nodes of the next hidden layer 622*b*, which can perform their own designated functions. Example functions include convolutional, up-sampling, data transformation, and/or any other suitable functions. The output of the hidden layer 622*b* can then activate nodes of the next hidden layer, and so on. The output of the last hidden layer 622*n* can activate one or more nodes of the output layer 624, at which an output is provided. In some cases, while nodes (e.g., node 626) in the neural network 600 are shown as having multiple output lines, a node has a single output and all lines shown as being output from a node represent the same output value.

In some cases, each node or interconnection between nodes can have a weight that is a set of parameters derived from the training of the neural network 600. Once the neural network 600 is trained, it can be referred to as a trained neural network, which can be used to classify one or more objects. For example, an interconnection between nodes can represent a piece of information learned about the interconnected nodes. The interconnection can have a tunable numeric weight that can be tuned (e.g., based on a training dataset), allowing the neural network 600 to be adaptive to inputs and able to learn as more and more data is processed.

The neural network 600 is pre-trained to process the features from the data in the input layer 620 using the different hidden layers 622*a*, 622*b*, through 622*n* in order to provide the output through the output layer 624. In an example in which the neural network 600 is used to identify objects in images, the neural network 600 can be trained using training data that includes both images and labels. For instance, training images can be input into the network, with each training image having a label indicating the classes of the one or more objects in each image (basically, indicating to the network what the objects are and what features they have). In one illustrative example, a training image can include an image of a number 2, in which case the label for the image can be [0 0 1 0 0 0 0 0 0 0].

In some cases, the neural network 600 can adjust the weights of the nodes using a training process called backpropagation. Backpropagation can include a forward pass, a loss function, a backward pass, and a weight update. The forward pass, loss function, backward pass, and parameter update is performed for one training iteration. The process can be repeated for a certain number of iterations for each set of training images until the neural network 600 is trained well enough so that the weights of the layers are accurately tuned.

For the example of identifying objects in images, the forward pass can include passing a training image through the neural network 600. The weights are initially randomized before the neural network 600 is trained. The image can include, for example, an array of numbers representing the pixels of the image. Each number in the array can include a value from 0 to 255 describing the pixel intensity at that position in the array. In one example, the array can include a 28×28×3 array of numbers with 28 rows and 28 columns of pixels and 3 color components (such as red, green, and blue, or luma and two chroma components, or the like).

For a first training iteration for the neural network 600, the output will likely include values that do not give preference to any particular class due to the weights being randomly selected at initialization. For example, if the output is a vector with probabilities that the object includes different classes, the probability value for each of the different classes may be equal or at least very similar (e.g., for ten possible classes, each class may have a probability value of 0.1). With the initial weights, the neural network 600 is unable to determine low level features and thus cannot make an accurate determination of what the classification of the object might be. A loss function can be used to analyze error in the output. Any suitable loss function definition can be used. One example of a loss function includes a mean squared error (MSE). The MSE is defined as $$E_{total} = \sum \frac{1}{2}(\text{target} - \text{output})^2,$$

which calculates the sum of one-half times the actual answer minus the predicted (output) answer squared. The loss can be set to be equal to the value of $E_{total}$.

The loss (or error) will be high for the first training images since the actual values will be much different than the predicted output. The goal of training is to minimize the amount of loss so that the predicted output is the same as the training label. The neural network 600 can perform a backward pass by determining which inputs (weights) most contributed to the loss of the network, and can adjust the weights so that the loss decreases and is eventually minimized.

A derivative of the loss with respect to the weights (denoted as dL/dW, where W are the weights at a particular layer) can be computed to determine the weights that contributed most to the loss of the network. After the derivative is computed, a weight update can be performed by updating all the weights of the filters. For example, the weights can be updated so that they change in the opposite direction of the gradient. The weight update can be denoted as $$w = w_i - \eta \frac{dL}{dW},$$

where w denotes a weight, $w_i$ denotes the initial weight, and $\eta$ denotes a learning rate. The learning rate can be set to any suitable value, with a high learning rate including larger weight updates and a lower value indicating smaller weight updates.

The neural network 600 can include any suitable deep network. One example includes a convolutional neural network (CNN), which includes an input layer and an output layer, with multiple hidden layers between the input and out layers. An example of a CNN is described below with respect to FIG. 7. The hidden layers of a CNN include a series of convolutional, nonlinear, pooling (for downsampling), and fully connected layers. The neural network 600 can include any other deep network other than a CNN, such as an autoencoder, a deep belief nets (DBNs), a Recurrent Neural Networks (RNNs), among others.

Figure 7:
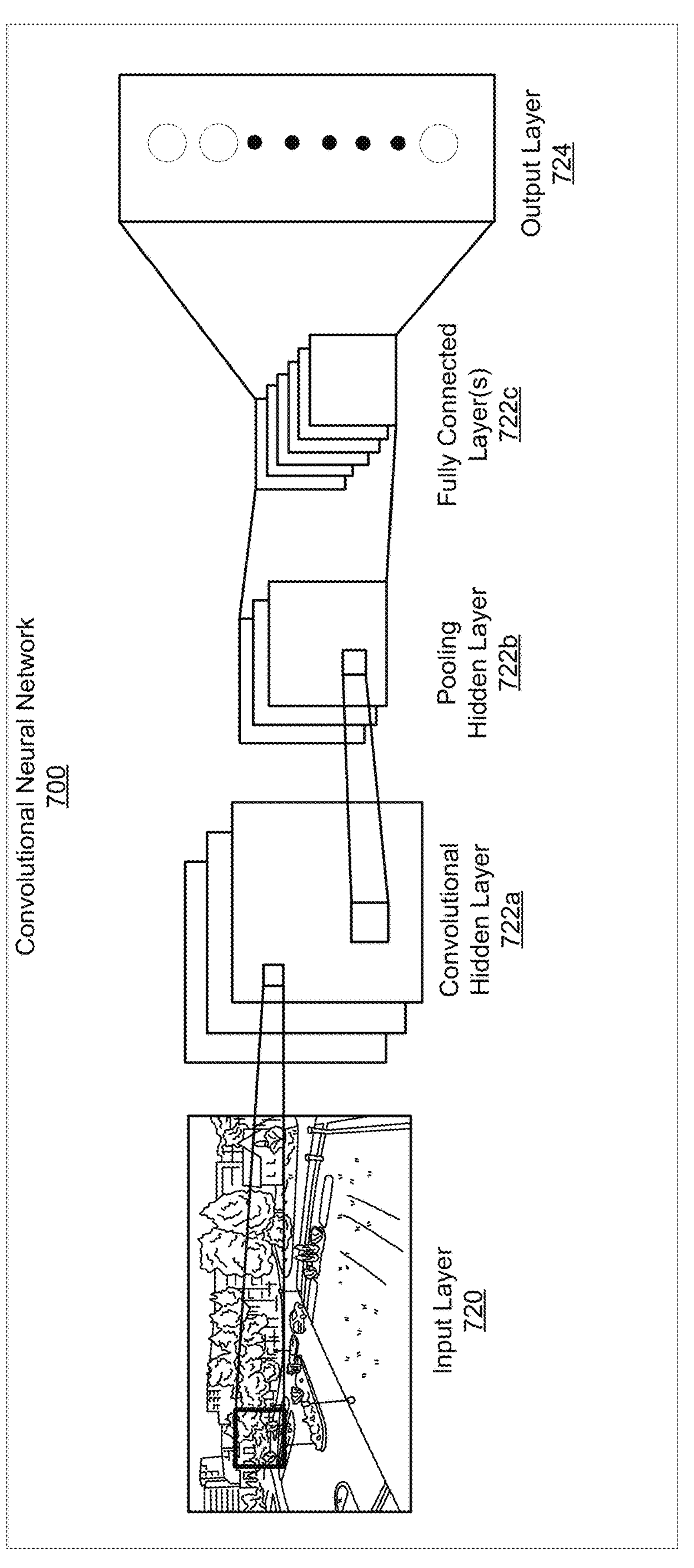
FIG. 7 is a block diagram illustrating an example of a convolutional neural network, according to aspects of the disclosure.

FIG. 7 is an illustrative example of a convolutional neural network 700 (CNN 700), according to aspects of the disclosure. The input layer 720 of the CNN 700 includes data representing an image. For example, the data can include an array of numbers representing the pixels of the image, with each number in the array including a value from 0 to 255 describing the pixel intensity at that position in the array. Using the previous example from above, the array can include a 28×28×3 array of numbers with 28 rows and 28 columns of pixels and 3 color components (e.g., red, green, and blue, or luma and two chroma components, or the like). The image can be passed through a convolutional hidden layer 722*a*, an optional non-linear activation layer, a pooling hidden layer 722*b*, and fully connected hidden layers 722*c* to get an output at the output layer 724. While only one of each hidden layer is shown in FIG. 7, one of ordinary skill will appreciate that multiple convolutional hidden layers, non-linear layers, pooling hidden layers, and/or fully connected layers can be included in the CNN 700. As previously described, the output can indicate a single class of an object or can include a probability of classes that best describe the object in the image.

The first layer of the CNN 700 is the convolutional hidden layer 722*a*. The convolutional hidden layer 722*a* analyzes the image data of the input layer 720. Each node of the convolutional hidden layer 722*a* is connected to a region of nodes (pixels) of the input image called a receptive field. The convolutional hidden layer 722*a* can be considered as one or more filters (each filter corresponding to a different activation or feature map), with each convolutional iteration of a filter being a node or neuron of the convolutional hidden layer 722*a*. For example, the region of the input image that a filter covers at each convolutional iteration would be the receptive field for the filter. In one illustrative example, if the input image includes a 28×28 array, and each filter (and corresponding receptive field) is a 5×5 array, then there will be 24×24 nodes in the convolutional hidden layer 722*a*. Each connection between a node and a receptive field for that node learns a weight and, in some cases, an overall bias such that each node learns to analyze its particular local receptive field in the input image. Each node of the hidden layer 722*a* will have the same weights and bias (called a shared weight and a shared bias). For example, the filter has an array of weights (numbers) and the same depth as the input. A filter will have a depth of 3 for the video frame example (according to three color components of the input image). An illustrative example size of the filter array is 5×5×3, corresponding to a size of the receptive field of a node.

The convolutional nature of the convolutional hidden layer 722*a* is due to each node of the convolutional layer being applied to its corresponding receptive field. For example, a filter of the convolutional hidden layer 722*a* can begin in the top-left corner of the input image array and can convolve around the input image. As noted above, each convolutional iteration of the filter can be considered a node or neuron of the convolutional hidden layer 722*a*. At each convolutional iteration, the values of the filter are multiplied with a corresponding number of the original pixel values of the image (e.g., the 5×5 filter array is multiplied by a 5×5 array of input pixel values at the top-left corner of the input image array). The multiplications from each convolutional iteration can be summed together to obtain a total sum for that iteration or node. The process is next continued at a next location in the input image according to the receptive field of a next node in the convolutional hidden layer 722*a*.

For example, a filter can be moved by a step amount to the next receptive field. The step amount can be set to 1 or other suitable amount. For example, if the step amount is set to 1, the filter will be moved to the right by 1 pixel at each convolutional iteration. Processing the filter at each unique location of the input volume produces a number representing the filter results for that location, resulting in a total sum value being determined for each node of the convolutional hidden layer 722*a*.

The mapping from the input layer to the convolutional hidden layer 722*a* is referred to as an activation map (or feature map). The activation map includes a value for each node representing the filter results at each locations of the input volume. The activation map can include an array that includes the various total sum values resulting from each iteration of the filter on the input volume. For example, the activation map will include a 24×24 array if a 5×5 filter is applied to each pixel (a step amount of 1) of a 28×28 input image. The convolutional hidden layer 722*a* can include several activation maps in order to identify multiple features in an image. The example shown in FIG. 7 includes three activation maps. Using three activation maps, the convolutional hidden layer 722*a* can detect three different kinds of features, with each feature being detectable across the entire image.

In some examples, a non-linear hidden layer can be applied after the convolutional hidden layer 722*a*. The non-linear layer can be used to introduce non-linearity to a system that has been computing linear operations. One illustrative example of a non-linear layer is a rectified linear unit (ReLU) layer. A ReLU layer can apply the function f(x)=max(0, x) to all of the values in the input volume, which changes all the negative activations to 0. The ReLU can thus increase the non-linear properties of the CNN 700 without affecting the receptive fields of the convolutional hidden layer 722*a*.

The pooling hidden layer 722*b* can be applied after the convolutional hidden layer 722*a* (and after the non-linear hidden layer when used). The pooling hidden layer 722*b* is used to simplify the information in the output from the convolutional hidden layer 722*a*. For example, the pooling hidden layer 722*b* can take each activation map output from the convolutional hidden layer 722*a* and generates a condensed activation map (or feature map) using a pooling function. Max-pooling is one example of a function performed by a pooling hidden layer. Other forms of pooling functions be used by the pooling hidden layer 722*a*, such as average pooling, L2-norm pooling, or other suitable pooling functions. A pooling function (e.g., a max-pooling filter, an L2-norm filter, or other suitable pooling filter) is applied to each activation map included in the convolutional hidden layer 722*a*. In the example shown in FIG. 7, three pooling filters are used for the three activation maps in the convolutional hidden layer 722*a*.

In some examples, max-pooling can be used by applying a max-pooling filter (e.g., having a size of 2×2) with a step amount (e.g., equal to a dimension of the filter, such as a step amount of 2) to an activation map output from the convolutional hidden layer 722*a*. The output from a max-pooling filter includes the maximum number in every sub-region that the filter convolves around. Using a 2×2 filter as an example, each unit in the pooling layer can summarize a region of 2×2 nodes in the previous layer (with each node being a value in the activation map). For example, four values (nodes) in an activation map will be analyzed by a 2×2 max-pooling filter at each iteration of the filter, with the maximum value from the four values being output as the "max" value. If such a max-pooling filter is applied to an activation filter from the convolutional hidden layer 722*a* having a dimension of 24×24 nodes, the output from the pooling hidden layer 722*b* will be an array of 12×12 nodes.

In some examples, an L2-norm pooling filter could also be used. The L2-norm pooling filter includes computing the square root of the sum of the squares of the values in the 2×2 region (or other suitable region) of an activation map (instead of computing the maximum values as is done in max-pooling), and using the computed values as an output.

Intuitively, the pooling function (e.g., max-pooling, L2-norm pooling, or other pooling function) determines whether a given feature is found anywhere in a region of the image, and discards the exact positional information. This can be done without affecting results of the feature detection because, once a feature has been found, the exact location of the feature is not as important as its approximate location relative to other features. Max-pooling (as well as other pooling methods) offer the benefit that there are many fewer pooled features, thus reducing the number of parameters needed in later layers of the CNN 700.

The final layer of connections in the network is a fully-connected layer that connects every node from the pooling hidden layer 722*b* to every one of the output nodes in the output layer 724. Using the example above, the input layer includes 28×28 nodes encoding the pixel intensities of the input image, the convolutional hidden layer 722*a* includes 3×24×24 hidden feature nodes based on application of a 5×5 local receptive field (for the filters) to three activation maps, and the pooling layer 722*b* includes a layer of 3×12×12 hidden feature nodes based on application of max-pooling filter to 2×2 regions across each of the three feature maps. Extending this example, the output layer 724 can include ten output nodes. In such an example, every node of the 3×12×12 pooling hidden layer 722*b* is connected to every node of the output layer 724.

The fully connected layer 722*c* can obtain the output of the previous pooling layer 722*b* (which should represent the activation maps of high-level features) and determines the features that most correlate to a particular class. For example, the fully connected layer 722*c* layer can determine the high-level features that most strongly correlate to a particular class, and can include weights (nodes) for the high-level features. A product can be computed between the weights of the fully connected layer 722*c* and the pooling hidden layer 722*b* to obtain probabilities for the different classes. For example, if the CNN 700 is being used to predict that an object in a video frame is a person, high values will be present in the activation maps that represent high-level features of people (e.g., two legs are present, a face is present at the top of the object, two eyes are present at the top left and top right of the face, a nose is present in the middle of the face, a mouth is present at the bottom of the face, and/or other features common for a person).

In some examples, the output from the output layer 724 can include an M-dimensional vector (in the prior example, M=10), where M can include the number of classes that the program has to choose from when classifying the object in the image. Other example outputs can also be provided. Each number in the N-dimensional vector can represent the probability the object is of a certain class. In one illustrative example, if a 10-dimensional output vector represents ten different classes of objects is [0 0 0.05 0.8 0 0.15 0 0 0 0], the vector indicates that there is a 5% probability that the image is the third class of object (e.g., a dog), an 80% probability that the image is the fourth class of object (e.g., a human), and a 15% probability that the image is the sixth class of object (e.g., a kangaroo). The probability for a class can be considered a confidence level that the object is part of that class.

Figure 8:
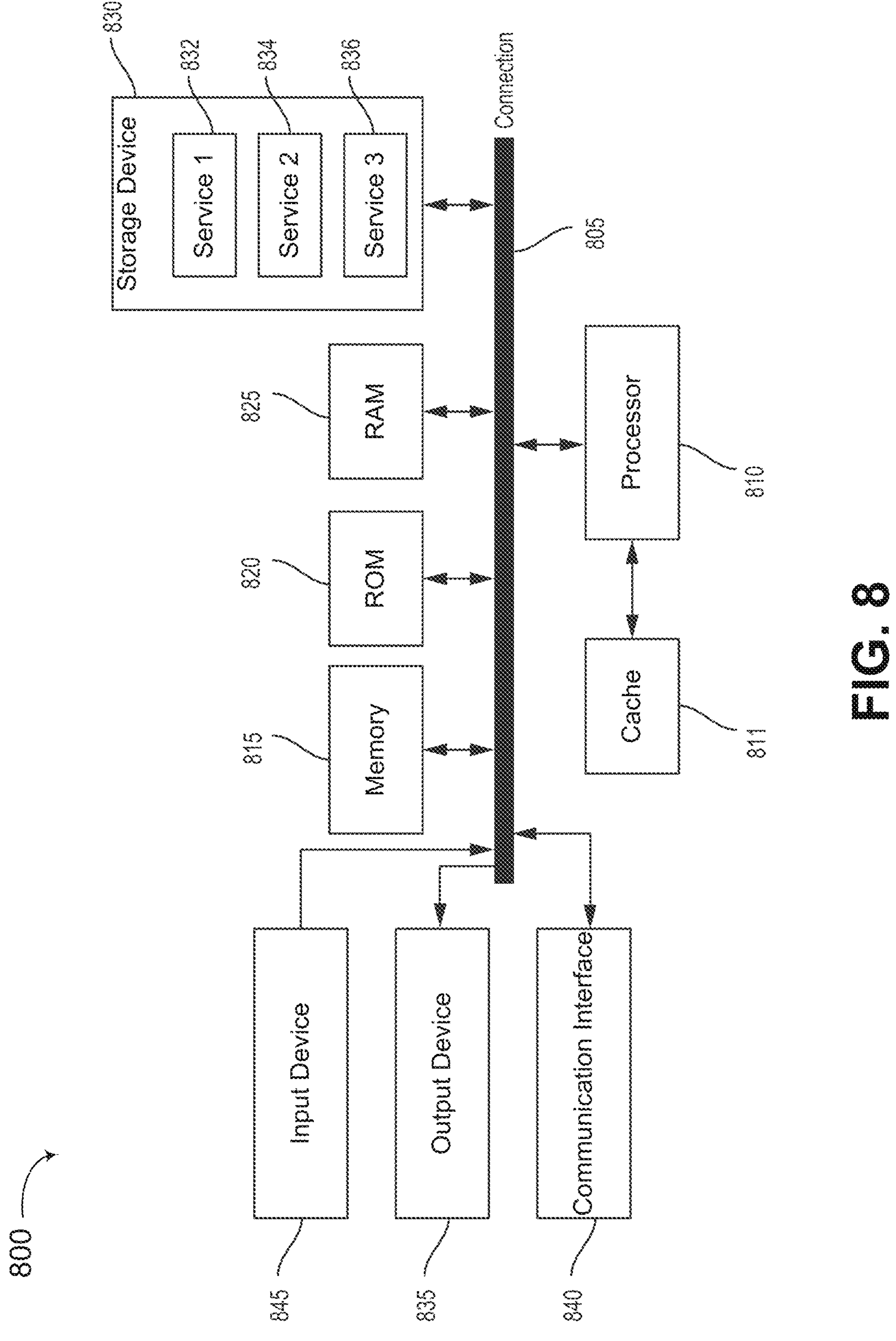
FIG. 8 is a diagram illustrating an example of a computing system, according to aspects of the disclosure.

FIG. 8 is a diagram illustrating an example of a system for implementing certain aspects of the present technology. In particular, FIG. 8 illustrates an example of computing system 800, which can be for example any computing device making up internal computing system, a remote computing system, a camera, or any component thereof in which the components of the system are in communication with each other using connection 805. Connection 805 can be a physical connection using a bus, or a direct connection into processor 810, such as in a chipset architecture. Connection 805 can also be a virtual connection, networked connection, or logical connection.

In some aspects, computing system 800 is a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

Example system 800 includes at least one processing unit (CPU or processor) 810 and connection 805 that couples various system components including system memory 815, such as read-only memory (ROM) 820 and random-access memory (RAM) 825 to processor 810. Computing system 800 can include a cache 811 of high-speed memory connected directly with, in close proximity to, or integrated as part of processor 810.

Processor 810 can include any general-purpose processor and a hardware service or software service, such as services 832, 834, and 836 stored in storage device 830, configured to control processor 810 as well as a special-purpose processor where software instructions are incorporated into the actual processor design. Processor 810 may essentially be a completely self-contained computing system, containing multiple cores or processors, a bus, memory controller, cache, etc. A multi-core processor may be symmetric or asymmetric.

To enable user interaction, computing system 800 includes an input device 845, which can represent any number of input mechanisms, such as a microphone for speech, a touch-sensitive screen for gesture or graphical input, keyboard, mouse, motion input, speech, etc. Computing system 800 can also include output device 835, which can be one or more of a number of output mechanisms. In some instances, multimodal systems can enable a user to provide multiple types of input/output to communicate with computing system 800. Computing system 800 can include communications interface 840, which can generally govern and manage the user input and system output.

The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, WLAN signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/long term evolution (LTE) cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

The communications interface 840 may also include one or more GNSS receivers or transceivers that are used to determine a location of the computing system 800 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 830 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a Europay, Mastercard and Visa (EMV) chip, a subscriber identity module (SIM) card, a mini/micro/nano/pico SIM card, another integrated circuit (IC) chip/card, RAM, static RAM (SRAM), dynamic RAM (DRAM), ROM, programmable read-only memory (PROM), erasable programmable read-only memory (EPROM), electrically erasable programmable read-only memory (EEPROM), flash EPROM (FLASHEPROM), cache memory (L1/L2/L3/L4/L5/L#), resistive random-access memory (RRAM/ReRAM), phase change memory (PCM), spin transfer torque RAM (STT-RAM), another memory chip or cartridge, and/or a combination thereof.

The storage device 830 can include software services, servers, services, etc., that when the code that defines such software is executed by the processor 810, it causes the system to perform a function. In some aspects, a hardware service that performs a particular function can include the software component stored in a computer-readable medium in connection with the necessary hardware components, such as processor 810, connection 805, output device 835, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some aspects, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium including program code including instructions that, when executed, performs one or more of the methods, algorithms, and/or operations described above. The computer-readable data storage medium may form part of a computer program product, which may include packaging materials. The computer-readable medium may include memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1. A method of providing virtual content for a display, the method comprising: obtaining a plurality of images captured by a camera of a device, each image of the plurality of images including a respective representation of an object in an environment; predicting, based on the plurality of images, a pose of the object in a reference coordinate system associated with the environment; determining, based on the predicted pose of the object in the reference coordinate system, a pose of the object relative to the device; and providing, to a display of the device, virtual content based on the pose of the object relative to the device.

Aspect 2. The method of aspect 1, wherein predicting the pose of the object comprises inferring, using a trained pose-prediction machine-learning model, the predicted pose of the object in the reference coordinate system based on the plurality of images.

Aspect 3. The method of any one of aspects 1 or 2, wherein the predicted pose of the object in the reference coordinate system is further based on previously-determined poses of the object.

Aspect 4. The method of any one of aspects 1 to 3, wherein predicting the pose of the object comprises: predicting a number of future poses of the object at a number of respective future times; and predicting the pose of the object based on interpolating between the predicted number of future poses.

Aspect 5. The method of any one of aspects 1 to 4, wherein determining, the pose of the object relative to the device comprises obtaining a transformation between the reference coordinate system and a device coordinate system associated with an orientation of the device and applying the transformation to the predicted pose of the object.

Aspect 6. The method of aspect 5, wherein the transformation is based on a head-pose prediction model.

Aspect 7. The method of any one of aspects 1 to 6, wherein: the plurality of images captured by the camera include the object and the environment from a perspective of the camera; and the method further comprises displaying the virtual content at a location of the display that is related to a pose of the object within a line of sight of a user of the device according to an orientation of the device and a position of the device.

Aspect 8. The method of any one of aspects 1 to 7, wherein the device is an extended-reality device.

Aspect 9. The method of any one of aspects 1 to 8, wherein the device is a see-through extended-reality device.

Aspect 10. An apparatus for providing virtual content for a display, the apparatus comprising: at least one memory; and at least one processor coupled to the at least one memory and configured to: obtain a plurality of images captured by a camera of a device, each image of the plurality of images including a respective representation of an object in an environment; predict, based on the plurality of images, a pose of the object in a reference coordinate system associated with the environment; determine, based on the predicted pose of the object in the reference coordinate system, a pose of the object relative to the device; and provide, to a display of the device, virtual content based on the pose of the object relative to the device.

Aspect 11. The apparatus of aspect 10, wherein the at least one processor is configured to, in predicting the pose of the object, infer, using a trained pose-prediction machine-learning model, the predicted pose of the object in the reference coordinate system based on the plurality of images.

Aspect 12. The apparatus of any one of aspects 10 or 11, wherein the predicted pose of the object in the reference coordinate system is further based on previously-determined poses of the object.

Aspect 13. The apparatus of any one of aspects 10 to 12, wherein the at least one processor is configured to, in predicting the pose of the object: predict a number of future poses of the object at a number of respective future times; and predict the pose of the object based on interpolating between the predicted number of future poses.

Aspect 14. The apparatus of any one of aspects 10 to 13, wherein the at least one processor is configured to, in determining, the pose of the object relative to the device, obtain a transformation between the reference coordinate system and a device coordinate system associated with an orientation of the device and apply the transformation to the predicted pose of the object.

Aspect 15. The apparatus of aspect 14, wherein the transformation is based on a head-pose prediction model.

Aspect 16. The apparatus of any one of aspects 10 to 15, wherein: the plurality of images captured by the camera include the object and the environment from a perspective of the camera; and the at least one processor is further configured to display the virtual content at a location of the display that is related to a pose of the object within a line of sight of a user of the device according to an orientation of the device and a position of the device.

Aspect 17. The apparatus of any one of aspects 10 to 16, wherein the device comprises a display and a camera of an extended-reality device and wherein the apparatus comprises a processor of the extended-reality device.

Aspect 18. The apparatus of any one of aspects 10 to 17, wherein the device comprises a display of a see-through extended-reality device and wherein the apparatus comprises a processor of the see-through extended-reality device.

Aspect 19. A non-transitory computer-readable storage medium having stored thereon instructions that, when executed by at least one processor, cause the at least one processor to perform operations according to any of aspects 1 to 9.

Aspect 20. An apparatus for providing virtual content for display, the apparatus comprising one or more means for perform operations according to any of aspects 1 to 9.

What is claimed is:

1. A method of providing virtual content for display, the method comprising:

obtaining a plurality of images captured by a camera of a device, each image of the plurality of images including a respective representation of a real-world object in an environment;

processing the plurality of images using a pose-prediction machine-learning model to predict a pose of the real-world object in a reference coordinate system associated with the environment, wherein the pose-prediction machine-learning model is trained to predict poses of real-world objects in reference coordinate systems based on images of the real-world objects;

obtaining a transformation between the reference coordinate system and a device coordinate system associated with an orientation of the device;

applying the transformation to the predicted pose of the real-world object in the reference coordinate system to obtain a pose of the real-world object relative to the device; and providing, to a display of the device, virtual content that is associated with the real-world object, wherein a pose of the virtual content is based on the pose of the real-world object relative to the device.

2. The method of claim 1, wherein the predicted pose of the real-world object in the reference coordinate system is further based on previously-determined poses of the real-world object.

3. The method of claim 1, wherein predicting the pose of the real-world object comprises:

predicting a number of future poses of the real-world object at a number of respective future times; and predicting the pose of the real-world object based on interpolating between the predicted number of future poses.

4. The method of claim 1, wherein the transformation is based on a head-pose prediction model.

5. The method of claim 1, wherein:

the plurality of images captured by the camera include the real-world object and the environment from a perspective of the camera; and the method further comprises displaying the virtual content at a location of the display that is related to a pose of the real-world object within a line of sight of a user of the device according to an orientation of the device and a position of the device.

6. The method of claim 1, wherein the device is an extended-reality device.

7. The method of claim 1, wherein the device is a see-through extended-reality device.

8. An apparatus for providing virtual content for display, the apparatus comprising:

at least one memory; and at least one processor coupled to the at least one memory and configured to:

obtain a plurality of images captured by a camera of a device, each image of the plurality of images including a respective representation of a real-world object in an environment;

process the plurality of images using a pose-prediction machine-learning model to predict a pose of the real-world object in a reference coordinate system associated with the environment, wherein the pose-prediction machine-learning model is trained to predict poses of real-world objects in reference coordinate systems based on images of the real-world objects;

obtain a transformation between the reference coordinate system and a device coordinate system associated with an orientation of the device;

apply the transformation to the predicted pose of the real-world object in the reference coordinate system to obtain a pose of the real-world object relative to the device; and provide, to a display of the device, virtual content that is associated with the real-world object, wherein a pose of the virtual content is based on the pose of the real-world object relative to the device.

9. The apparatus of claim 8, wherein the at least one processor is configured to predict the pose of the real-world object in the reference coordinate system is-further based on previously-determined poses of the real-world object.

10. The apparatus of claim 8, wherein, to predict the pose of the real-world object, the at least one processor is configured to:

predict a number of future poses of the real-world object at a number of respective future times; and predict the pose of the real-world object based on interpolating between the predicted number of future poses.

11. The apparatus of claim 8, wherein the transformation is based on a head-pose prediction model.

12. The apparatus of claim 8, wherein:

the plurality of images captured by the camera include the real-world object and the environment from a perspective of the camera; and the at least one processor is further configured to display the virtual content at a location of the display that is related to a pose of the real-world object within a line of sight of a user of the device according to an orientation of the device and a position of the device.

13. The apparatus of claim 8, wherein the device comprises a display and a camera of an extended-reality device and wherein the apparatus comprises a processor of the extended-reality device.

14. The apparatus of claim 8, wherein the device comprises a display of a see-through extended-reality device and wherein the apparatus comprises a processor of the see-through extended-reality device.

15. A non-transitory computer-readable storage medium having stored thereon instructions that, when executed by at least one processor, cause the at least one processor to:

obtain a plurality of images captured by a camera of a device, each image of the plurality of images including a respective representation of a real-world object in an environment;

process the plurality of images using a pose-prediction machine-learning model to predict a pose of the real-world object in a reference coordinate system associated with the environment, wherein the pose-prediction machine-learning model is trained to predict poses of real-world objects in reference coordinate systems based on images of the real-world objects;

obtain a transformation between the reference coordinate system and a device coordinate system associated with an orientation of the device;

apply the transformation to the predicted pose of the real-world object in the reference coordinate system to obtain a pose of the real-world object relative to the device; and provide, to a display of the device, virtual content that is associated with the real-world object, wherein a pose of the virtual content is based on the pose of the real-world object relative to the device.

16. The non-transitory computer-readable storage medium of claim 15, wherein the predicted pose of the real-world object in the reference coordinate system is further based on previously-determined poses of the real-world object.

17. The non-transitory computer-readable storage medium of claim 15, wherein the instructions, when executed by at least one processor, cause the at least one processor to, in predicting the pose of the real-world object:

predict a number of future poses of the real-world object at a number of respective future times; and predict the pose of the real-world object based on interpolating between the predicted number of future poses.

18. The non-transitory computer-readable storage medium of claim 15, wherein the transformation is based on a head-pose prediction model.

19. The non-transitory computer-readable storage medium of claim 15, wherein:

the plurality of images captured by the camera include the real-world object and the environment from a perspective of the camera; and the instructions, when executed by at least one processor, cause the at least one processor to display the virtual content at a location of the display that is related to a pose of the real-world object within a line of sight of a user of the device according to an orientation of the device and a position of the device.

20. The non-transitory computer-readable storage medium of claim 15, wherein the device comprises a display and a camera of an extended-reality device and wherein the at least one processor is a component of a computing unit of the extended-reality device.

21. The non-transitory computer-readable storage medium of claim 15, wherein the device comprises a display of a see-through extended-reality device and wherein the at least one processor is a component of a computing unit of the see-through extended-reality device.

22. An apparatus for providing virtual content for display, the apparatus comprising:

one or more means for obtaining a plurality of images captured by a camera of a device, each image of the plurality of images including a respective representation of a real-world object in an environment;

one or more means for processing the plurality of images using a pose-prediction machine-learning model to predict a pose of the real-world object in a reference coordinate system associated with the environment, wherein the pose-prediction machine-learning model is trained to predict poses of real-world objects in reference coordinate systems based on images of the real-world objects;

one or more means for obtaining a transformation between the reference coordinate system and a device coordinate system associated with an orientation of the device;

one or more means for applying the transformation to the predicted pose of the real-world object in the reference coordinate system to obtain a pose of the real-world object relative to the device; and one or more means for providing, to a display of the device, virtual content that is associated with the real-world object, wherein a pose of the virtual content is based on the pose of the real-world object relative to the device.

* * * * *